United States Patent
Slade et al.

(10) Patent No.: US 10,926,594 B2
(45) Date of Patent: Feb. 23, 2021

(54) CABLE SYSTEM FOR A TRUCK TRAILER

(71) Applicant: Grote Industries, Inc., Madison, IN (US)

(72) Inventors: Adam Slade, Madison, IN (US); Sankalp Pampattiwar, Madison, IN (US); Cesar Perez-Bolivar, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 113 days.

(21) Appl. No.: 16/397,108

(22) Filed: Apr. 29, 2019

(65) Prior Publication Data

US 2020/0338941 A1 Oct. 29, 2020

(51) Int. Cl.
*B60D 1/62* (2006.01)
*B60R 16/023* (2006.01)
*B62D 63/08* (2006.01)

(52) U.S. Cl.
CPC ........... *B60D 1/62* (2013.01); *B60R 16/0239* (2013.01); *B62D 63/08* (2013.01); *B60Y 2304/01* (2013.01); *H01R 2201/26* (2013.01)

(58) Field of Classification Search
CPC ...... B60D 1/62; B60R 16/0239; B62D 63/08; B60Y 2304/01; H01R 2201/26
See application file for complete search history.

(56) References Cited

U.S. PATENT DOCUMENTS

| | | | |
|---|---|---|---|
| 5,142,278 A | 4/1992 | Moallemi et al. | |
| 5,739,592 A | 4/1998 | Rigsby et al. | |
| 5,999,091 A | 12/1999 | Wortham | |
| 6,582,033 B2 | 6/2003 | Lesesky et al. | |
| 7,415,325 B2* | 8/2008 | Knosmann | B60D 1/62 280/400 |
| 7,449,993 B2 | 11/2008 | Lesesky et al. | |
| 7,574,287 B2 | 8/2009 | Lang et al. | |
| 8,276,996 B2 | 10/2012 | Lesesky et al. | |
| 8,680,976 B2 | 3/2014 | Lesesky | |
| 9,499,109 B2 | 11/2016 | Armacost et al. | |
| 10,647,369 B2* | 5/2020 | Weaver | G05B 19/4185 |
| 2004/0164516 A1* | 8/2004 | Baginski | B60D 1/62 280/420 |
| 2008/0218323 A1 | 9/2008 | Lesesky et al. | |
| 2013/0306345 A1* | 11/2013 | Wentzel | H01R 13/53 174/93 |

(Continued)

*Primary Examiner* — Abdullah A Riyami
*Assistant Examiner* — Nader J Alhawamdeh
(74) *Attorney, Agent, or Firm* — Woodard Emhardt Henry Reeves & Wagner LLP

(57) ABSTRACT

A cable system for a truck trailer for reducing the number and/or size of wiring in a commercial trailer cable system from seven to four, three, or two, while also facilitating bidirectional communication with all connected electronic devices in the trailer. The cable system has a ground cable, a power cable, and zero, one or two additional communication cables that may carry analog and/or digital communications between the control circuit and components of the trailer such as turn signal lamps, brake lamps, backup cameras, environmental sensors, and the like. A transformer for increasing the voltage on the power cable is disclosed, allowing the power and ground cables to be smaller without reducing power delivered to the trailer.

26 Claims, 7 Drawing Sheets

(56) References Cited

U.S. PATENT DOCUMENTS

| | | | |
|---|---|---|---|
| 2014/0073180 A1* | 3/2014 | Knight | H01R 13/5221 |
| | | | 439/588 |
| 2016/0023587 A1 | 1/2016 | Bean | |
| 2017/0102415 A1* | 4/2017 | Sarchi | G01R 15/246 |
| 2018/0229786 A1* | 8/2018 | Weaver | H04W 84/042 |
| 2019/0048687 A1* | 2/2019 | Krippner | G01R 31/52 |

* cited by examiner

CABLE SYSTEM FOR A TRUCK TRAILER

BACKGROUND

The present disclosure relates generally to cabling systems for delivering power electronic communications between a truck tractor and trailer. A conventional cable system for a trailer may utilize multiple large copper wires. For example, a conventional cabling system conforming to the Society of Automotive Engineers (SAE) J-560 standard may include an 8 gauge ground wire, as measured according to the American Wire Gauge (AWG) standard, frequently included as the white colored wire. It may further include a 10 AWG wire (typically red) that is dedicated to brake or stop lamps, while an additional 10 AWG wire (often blue) is dedicated to provide continuous ABS primary power and, alternatively, power for auxiliary devices. Four 12 AWG wires are commonly included (such as the yellow, green, brown, and black) wires, with the yellow wire often dedicated to the left turn signal and hazard lamps, the green wire often dedicated to the right turn signal and hazard lamps, the brown wire often used for tail and license plates and clearance and/or side marker lamps, and the black wire often used for clearance, side marker, and identification lamps. Thus, the conventional J-560 compliant cable system has an aggregate cross-sectional area of copper of about 32 $mm^2$ calculated as the aggregate of four metallic 12 AWG cables each with a cross-sectional area of 3.3 $mm^2$, two metallic 10 AWG cables each with a cross-sectional area of 5.3 $mm^2$, one metallic 8 AWG cables each with a cross-sectional area of 8.4 $mm^2$.

Each wire in a conventional cabling system is generally limited in what it may be used for because it is often electrically connected to deliver power only to specific portions of the trailer lighting system. The truck is usually configured to provide power on a particular line according to the activities of the driver (e.g. activating turn signals, applying brakes, etc.) thus the conventional system is limited by these specific connections. For example, the same wires used to power the brake lights generally cannot be used to power the left or right turn signals. Also, more recently, trailers often include other electronic devices such as sensors for monitoring the state of the trailer and the load, cameras for providing additional visibility behind an adjacent the trailer, additional exterior or interior lighting to aid in maintenance or loading and unloading, or other electronic devices that preferably interact with the truck tractor to name a few nonlimiting examples. However, with a limited number of electrical connections between the trailer and the tractor, and with each connection being dedicated to only a narrow set of basic functions, conventional trailer cabling systems cannot easily accommodate the growing number of electronic devices used in trailers.

SUMMARY

Disclosed is a cable system for a truck trailer that reduces the number and/or size of cables to reduce metal usage. The number of copper conductors in a conventional trailer wiring system may be reduced from seven to four, three, or two, and may also be configured to provide bidirectional communication with all connected devices. The four, three, or two wires optionally include a ground, power, and either zero, one or two communication wires that may carry analog or digital communications. These communications can be carried by any suitable protocol or technique, examples of which include, but are not limited to, Power Line Communication (PLC) on zero additional wires (power and ground only), Pulsed Width Modulation (PWM), or Local Interconnect Network (LIN) on one additional wire (power, ground, and one communications cable), or RS-485 or Control Area Network (CAN) on two additional wires (power, ground, and two communications wires).

A conventional trailer may receive input from the truck via a standard J-560 connector at a trailer connection point (sometimes colloquially referred to as the "nose box"). These inputs may be used by an internal control circuit to determine which lamps, sensors, cameras, or other trailer devices should be activated or accessed, if any.

The cable system is optionally routed to every separate electronic device in the trailer. Power lines (ground and power) may use heavier gauge wire for power transmission, while the remaining communication wires (if any) may use smaller gauge wire. The one or two (if any) communication wires may communicate with the devices to activate or deactivate them as needed, and it may be used to transmit data from the devices back to the truck via the nose box connection, or via an optional second wired connection to the truck, or via a separate wireless communications link. For example, a telematics device may be used in conjunction with the cable system to receive data from and communicate instructions to the trailer remotely. Wireless sensors on the trailer may also use a direct wireless link to the nose box to convey information, rather than (or in addition to) relying on the wired communication.

Data communicated between the nose box and trailer devices (lights, actuators, sensors) can include, but is not limited to, the following: voltage and current at each device, health status of lamps, environmental data from lamp or sensor locations (temperature, humidity, pressure, vibration, tilt, acceleration, etc.), total uptime, expected remaining life, diagnostics, prognostics, video/sound feeds, device identifications, exceptions, actuations (e.g. on/off/dim/blink), door ajar sensors, occupancy, load, etc. These communications are not limited to any particular digital or analog protocol.

The overall amount of metal (e.g. copper) used in the cable system may be reduced thus reducing the cost of manufacture, as well as the size and weight of the cable. The six non-ground wires may be replaced with a single voltage supply such as a single wire, thus retaining current-carrying capacity while reducing metal. This single wire may carry, for example, 12 volts, 24 volts, 48 volts, or any other suitable supply voltage. Communication wires may for example, utilize 18 AWG (or smaller) gauge wire. An optional transformer may be included to boost the voltage at the nose box to 24 or 48 V, regardless of the supply voltage from the tractor. This can further reduce the metal requirement while retaining the total power transmitted. For example, if a traditional harness uses an 8 AWG ground wire, 10 AWG wire for two wires (such as the red and blue lines), and 12 AWG wire for four (such as the yellow, green, brown, and black) wires, a four-wire cable system disclosed herein may reduce this to two 8 AWG wires and two 18 AWG wires for a 12 V implementation, or two 12 AWG wires and two 18 AWG wires for a 24 V implementation, or four 18 AWG wires for a 48 V implementation. Depending on the wiring sizes used, the overall reduction in metal usage may be greater than 10%, greater than 20%, greater than 40%, greater than 70%, or greater than 90%.

In one example, the cable assembly includes separate metallic cables that are at least ten meters long that include at least a first metallic power cable electrically connectable to multiple components of a truck trailer, wherein the power cable is electrically conductive, and wherein the multiple components include a vehicle tail lamp, and a vehicle turn signal lamp. In another aspect, the cable system may also include a metallic ground cable electrically connectable to the components of the truck trailer, wherein the ground cable is electrically conductive.

In another aspect, the cable system may also include at least one metallic communications cable connectable to the components of the truck trailer, wherein when present, the aggregate cross-sectional area of the metallic power cable, the metallic ground cable, and each of the metallic communications cable when present, is at least ten percent (10%) less than the aggregate cross-sectional area of about 32 mm$^2$ in a conventional J-560 compliant cable system. In another aspect, the aggregate cross-sectional area of the metallic power cable, the metallic ground cable, and each of the metallic communications cable when present, is at least forty percent (40%) less than about 32 mm$^2$. In another aspect, the metallic power cable and the metallic ground cable may be predominantly copper. In another aspect, the assembly of separate metallic cables further includes a second metallic power cable to provide dedicated electrical power to the trailer Anti-lock Braking System (ABS).

In another example of the disclosed cable system, the cable system includes an adapter having an adapter plug with seven connection terminals corresponding to trailer connection terminals of a truck tractor, the seven connection terminals including a ground cable connection and six separate power cable connections. The adapter plug includes at least two of the six separate power cable connections being combined to be electrically conductive with the metallic power cable, and the ground connection terminal to electrically connect to the metallic ground cable. A control circuit may be included that is configured to connect to at least one of the metallic power cable, metallic ground cable, and an optional communications cable, wherein the control circuit is configured to receive thereacross communications signals from a plurality of the multiple components of the truck trailer.

In another example of the disclosed cable system, the cable system includes a power cable electrically connectable to multiple components of a truck trailer, wherein the power cable is electrically conductive, and wherein the multiple components include a vehicle tail lamp, and a vehicle turn signal lamp, a metallic ground cable electrically connectable to the components of the truck trailer, wherein the ground cable is electrically conductive, optionally, at least one communications cable connectable to the components of the truck trailer, and an adapter. The adapter includes an adapter plug with seven connection terminals corresponding to trailer connection terminals of a truck tractor, the seven connection terminals including a ground cable connection and six separate power cable connections, the adapter plug including at least two of the six separate power cable connections being combined to be electrically conductive with the metallic power cable, the ground connection terminal to electrically connect to the metallic ground cable, and a control circuit configured to connect to at least one of the metallic power cable, metallic ground cable, and an optional communications cable, wherein the control circuit is configured to receive thereacross communications signals from a plurality of the multiple components of the truck trailer.

In another aspect, the seven connection terminals of the adapter plug, and the trailer connection terminals are arranged according to a conventional J-560 trailer connection, wherein the control circuit optionally sends the component control signals on the power cable.

In another aspect, the cable system further includes a component control circuit electrically connected to the power cable and the ground cable, and an electronic device electrically connected to the component control circuit, wherein the component control circuit is configured to receive the component control signals sent by the control circuit of the adapter; and wherein the component control circuit is configured to selectively control the operation of the electronic device. In another aspect, the electronic device may be an LED lamp.

In another aspect, the multiple trailer components optionally include electronic devices such as vehicle stop-tail-turn lamps, vehicle turn signal lamps, vehicle brake lamps, vehicle tail lamps, vehicle running lamps, vehicle anti-lock brakes, vehicle interior illumination lamps, vehicle reverse lamps, or any combination thereof. In another aspect, the trailer components optionally include an antilock brake system controller, pressure sensors, temperature sensors, door sensors, cargo sensors, cargo length sensors, liquid level sensors, refrigeration sensors, or any combination thereof.

In another aspect, the power cable has a cross-sectional area less than or equal to a circular 8 gauge cable. In another aspect, the power cable has a cross-sectional area less than or equal to a circular 12 gauge cable, in another aspect, the power terminal of the trailer connection terminals is operable to provide at least 24 Volts and not more than 20 Amperes, wherein the power cable optionally has a cross-sectional area less than or equal to a circular 18 gauge cable. In another aspect, the power terminal of the trailer connection terminals is operable to provide at least 48 Volts and not more than 10 Amperes.

In another aspect, the cable system optionally includes a voltage transformer electrically connected to the power cable and the power terminals, wherein the voltage transformer and is configured to increase the voltage provided by the power terminals and to deliver the increased voltage to the power cable. In another aspect, the voltage transformer optionally increases the voltage from 12 volts to at least 24 volts. In another aspect, the power cable, and the ground cable include electrically conductive material, and wherein the electrically conductive material used is less than 40 percent of the electrical conductive material used in a standard 7 cable J-560 truck trailer cable system.

In another aspect, the at least one optional communications cable includes a first communications cable and a second communications cable, wherein both of the communications cables are electrically connected to the control circuit of the adapter with the multiple vehicle components, wherein the electrical signals generated by the control circuit are sent on both of the communications cables. In another aspect, the first and second communications cables have a cross-sectional area less than or equal to the cross-sectional area of the power cable or the ground cable.

In another aspect, the control circuit optionally further comprises a Control Area Network (CAN) controller electrically connected to the trailer connection terminals; and a CAN transceiver electrically connected to the CAN controller and the first and second communications cables, wherein the electrical signals sent by the control circuit are generated by the CAN controller and sent by the CAN transceiver. In another aspect, the multiple components of the truck trailer optionally include a component control circuit electrically connected to the power cable and the ground cable, the component control circuit including a CAN controller electrically connected to the power and ground cables, a CAN transceiver electrically connected to the CAN controller and the first and second communications cables, and an electronic device electrically connected to the power cable and the CAN controller, wherein the CAN transceiver in the component control circuit is responsive to the CAN transceiver of the control circuit, and wherein the CAN controller is configured to control the electronic device. In another aspect, the first and second communications cables optionally have a cross-sectional area less than or equal to the cross-sectional area of the power cable or the ground cable. In another aspect, the electronic device is optionally an LED lamp.

In another example of the disclosed cable system, the cable system includes an assembly of separate metallic cables that are at least ten meters long that optionally include at least a first metallic power cable electrically connectable to multiple components of a truck trailer, a metallic electrically conductive ground cable electrically connectable to the components of the truck trailer, at least one metallic communications cable connectable to the components of the truck trailer, and an adapter. The adapter optionally includes an adapter plug with seven connection terminals corresponding to trailer connection terminals of a truck tractor, the seven connection terminals including a ground cable connection and six separate power cable connections, and a control circuit configured to connect to at least one of the metallic power cable, metallic ground cable, and the at least one metallic communications cable. The control circuit is configured to receive thereacross communications signals from a plurality of the multiple components of the truck trailer, the aggregate cross-sectional area of the metallic power cable, the metallic ground cable, and each of the metallic communications cable when present, is at least ten percent (10%) less than the about 32 mm$^2$ present in a conventional J-560 compliant cable system.

In another aspect, the at least one communications cable includes a first communications cable and a second communications cable, wherein both of the communications cables are electrically connected to the control circuit of the adapter and the multiple vehicle components, and wherein the electrical signals generated by the control circuit are sent on both of the communications cables. In another aspect, the first and second communications cables have a cross-sectional area less than or equal to the cross-sectional area of the power cable or the ground cable.

In another aspect, the control circuit optionally comprises a Control Area Network (CAN) controller electrically connected to the trailer connection terminals; and a CAN transceiver electrically connected to the CAN controller and the first and second communications cables, wherein the electrical signals sent by the control circuit are generated by the CAN controller and sent by the CAN transceiver.

In another aspect, the multiple components of the truck trailer optionally include a component control circuit electrically connected to the power cable and the ground cable, the component control circuit optionally including a CAN controller electrically connected to the power and ground cables, a CAN transceiver electrically connected to the CAN controller and the first and second communications cables, and an electronic device electrically connected to the power cable and the CAN controller. The CAN transceiver in the component control circuit is optionally responsive to the CAN transceiver of the control circuit. The CAN controller is optionally configured to control the electronic device. In another aspect, the first and second communications cables may have a cross-sectional area less than or equal to the cross-sectional area of the power cable or the ground cable. In another aspect, the electronic devices optionally include an LED lamp.

DETAILED DESCRIPTION

Figure 1:
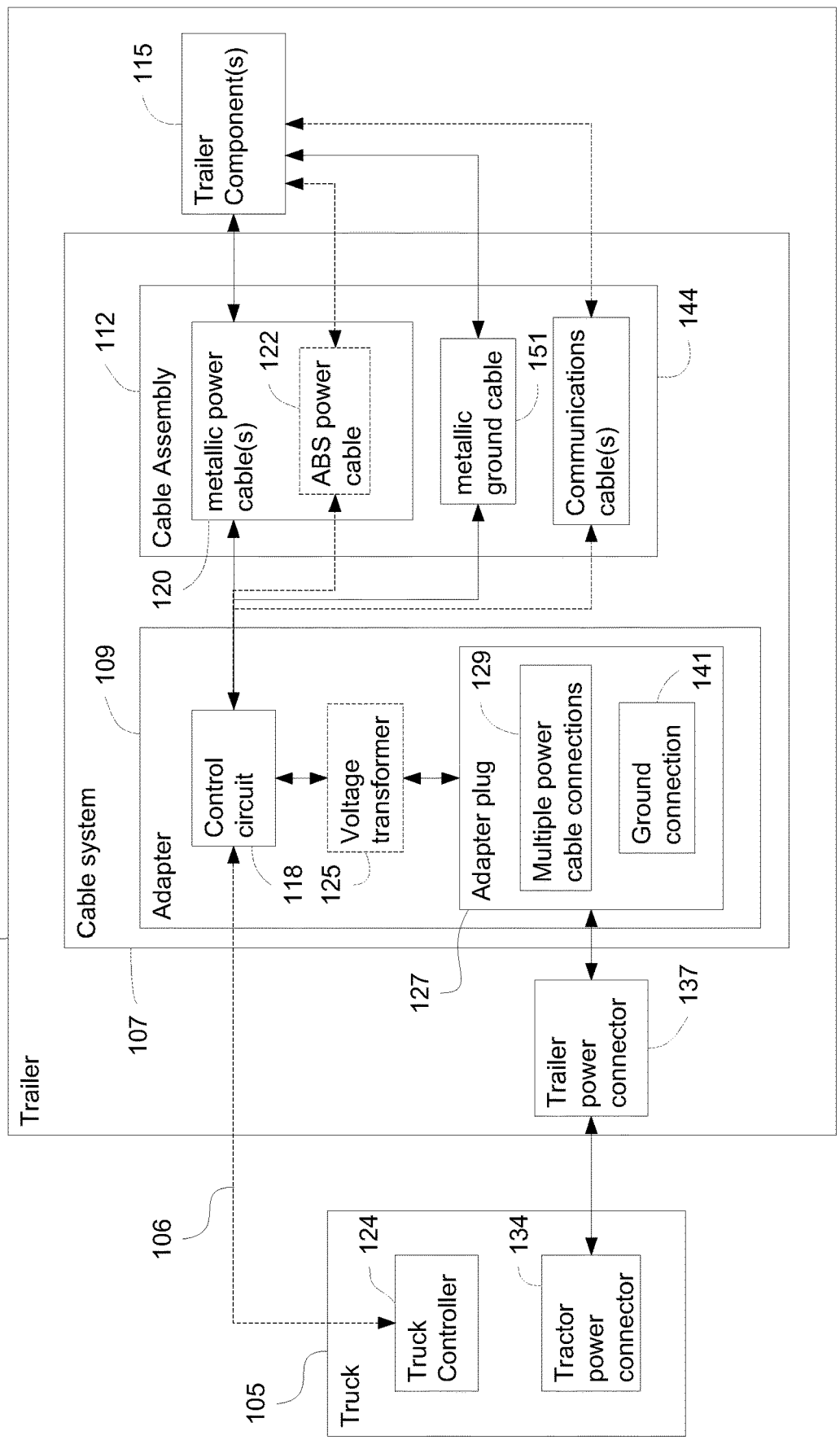
FIG. 1 is a component diagram illustrating one example of components that may be included in a cable system for a trailer.

FIG. 1 illustrates at 100 components that may be included in a cable system for a truck trailer. A trailer 103 is configured for towing by a truck 105 such as by any suitable hitching or coupling system. Trailer 103 includes a cable system 107 for carrying power, and optionally, electrical signals, from the truck to one or more trailer components 115. These trailer components can include any of a wide range of electronic, mechanical, or other devices or systems which are discussed in further detail below.

Cable system 107 is configured generally to carry electricity from a trailer power connector 137 to the trailer components 115. Cable system 107 may receive power from trailer power connector 137, which may be electrically connected to a corresponding tractor power connector 134. This initial electrical connection from the tractor to the trailer may include any suitable number of wires such as 2 or more, 4, 5, or 6 wires, or 7 or more wires. For example, the tractor and trailer may be electrically connected using an industry standard power cable having an SAE J-560 7-wire trailer power connector on each end. A J-560 power connecter on one end of the cable may be, for example, inserted into tractor power connector 134, and the J-560 power connecter on the other end of the cable may be inserted into the trailer power connector 137.

Figure 2:
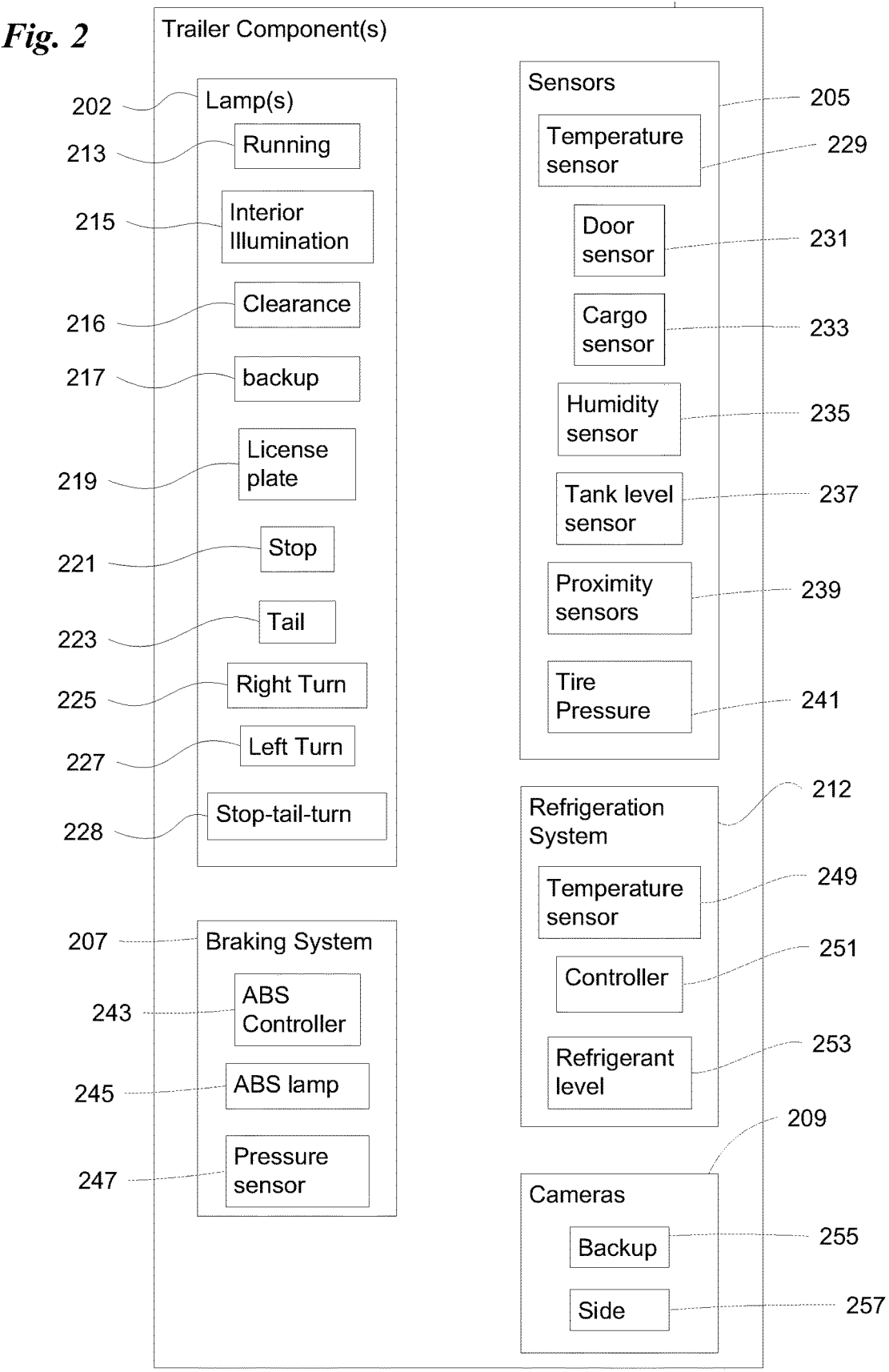
FIG. 2 is a component diagram illustrating examples of trailer components that may be included in the cable system of FIG. 1.

Examples of trailer components that may be electrically connected to cable system 107 are shown in FIG. 2, and include lamps 202, braking system components 207, sensors 205, cameras 209, and/or a refrigeration system 212. Some of these may be not be included, while others trailer components may be included that are not listed. For example, lamps 202 may include, but are not limited to, running lamps 213, interior illumination lamps 215 for lighting the interior of the trailer, side marking/clearance/identification lamps 216 for marking extremities of the trailer, backup lamps 217 for illuminating the area behind the trailer, license plate lamps 219 for lighting license plates and other identifying indicia mounted on the trailer, stop or brake lamps 221 that may illuminate when the vehicle is actively braking, tail lamps 223, left and right turn signal lamps 227 and 225 respectively, and alternatively, combination stop-tail-turn lamps 228.

Sensors 205 may include any of temperature sensors 229 for sensing the temperature in and/or around trailer 103, door sensor 231 configured to optionally sense when trailer doors are open or closed, cargo sensor 233 configured to optionally sense weight, location, and/or other attributes of cargo in or on trailer 103, humidity sensor 235 for optionally sensing absolute or relative humidity in and/or around trailer 103, a tank level sensor 237 optionally for sensing the level of fluids (liquids or gases) carried by trailer 103, proximity sensors 239 optionally for sensing proximity of trailer 103 relative to nearby objects, and/or tire pressure sensors 241 optionally for sensing pressure levels in tires on trailer 103.

Braking system trailer components 207 may optionally include an ABS controller 243 for controlling the ABS braking system, an ABS lamp 245 optionally for indicating the status or failure of the braking system 207, and/or a pressure sensor 247 optionally included to sense changes in hydraulic or air pressure in braking system 207. Other optional trailer components include cameras 209 such as one or more backup cameras 255 for optionally capturing a view of the surrounding area directly behind the trailer 103, and one or more side cameras 257 for optionally capturing a view of areas adjacent the sides of trailer 103.

Components of a refrigeration system 212 may include a temperature sensor for determining the temperature inside the refrigerated cargo area of the trailer, a controller 251 configure to control the refrigeration cycle in the refrigeration system, and a refrigerant level sensor 253 for determining the level of refrigerant in the system 212. Other trailer components may be included in trailer 103 and coupled to cable system 107.

Figure 3:
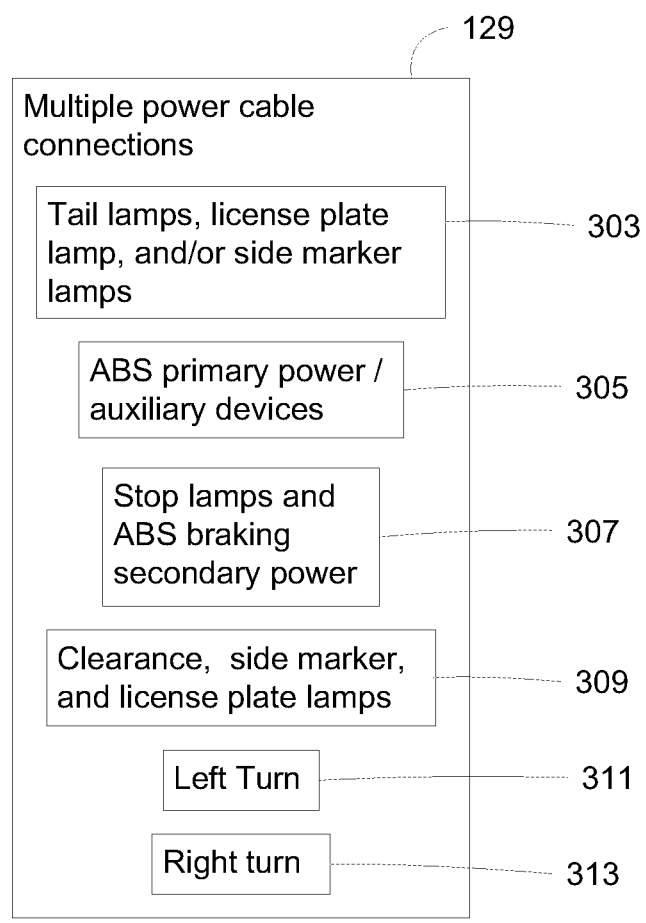
FIG. 3 is a component diagram illustrating examples of power cable connections that may be included in the cable system of FIG. 1.

Trailer power connector 137 may be electrically connected to an adapter 109 included in cable system 107. This adapter 109 may include an adapter plug 127 with multiple power cable connection terminals 129 and a ground connection 141, the multiple power cable connections and the ground connection corresponding to trailer connection terminals of a truck tractor. For example, the trailer power connector may have the seven connection terminals corresponding to the pins in a J-560 power connector, including a ground cable connection 141 and six separate power cable connections 129 illustrated in FIG. 3. These include, tail lamps, license plate lamp, and/or side marker lamps 303, ABS primary power/auxiliary device connection 305, stop lamps and ABS braking secondary power connection 307, clearance, side marker, and license plate lamps 309, and left and right turn signal power connections 311 and 313 respectively. Adapter plug 127 may have seven connection terminals corresponding to these or other terminals in the trailer power connector 137. Terminals in trailer power connecter 137 optionally correspond to connection terminals in the tractor power connecter 134. In this way, electricity or electrical signals may be received from the truck by the cable system 107.

Adapter 109 may provide power and/or transfer electrical signals two and from cable system 107. For example, cable system 107 may include a cable assembly 112 with one or more metallic power cables 120 electrically connected to the trailer components 115. Power cables 120 may include certain power cables specific to particular systems or subsystems of trailer 103. For example, cable assembly 112 optionally includes a power cable 122 dedicated to provide Antilock Brake System (ABS) power and/or electrical signals to ABS related trailer components 115. Cable assembly 112 may also include a metallic ground cable 151 and optionally zero or more communication cables 144 configured to send and receive signals representing data and/or control signals passed to and from trailer components 115. Cable assembly 112 may thus be composed of separate metallic cables of any suitable length such as greater than 5 m long, 10 m long, or greater than 30 m long.

In another aspect, a control circuit 118 may be included in adapter 109 and configured to selectively electrically connect and disconnect metallic power cables 120, metallic ground cable 151, and the optional communication cable or cables 144. Control circuit 118 may be configured to send and/or receive communications signals from a plurality of the multiple components of the truck trailer using any suitable combination of cables in cable assembly 112.

Control messages or signals may be sent from a control circuit 118. In another aspect, the status operational messages, or other signals sent by trailer components 115 may be received by control circuit 118. For example, control circuit 118 may send an activation message to a backup camera trailer component. The backup camera may begin capturing video imagery from behind the trailer. The captured video imagery may then be passed back to control circuit 118 is operational messages or signals providing control circuit 118 with access to real-time video imagery. Status information, as well as operational data (e.g. a video feed), may optionally be provided to the truck by control circuit 118 using an optional additional communications link such as link 106. Control circuit 118 may use communications link 106 to send communicate directly with the truck's internal computer or controller 124 such as in the case of communicating with the Electronic Control Unit (ECU). This link may be implemented as a wireless connection using any suitable wireless transmission technology, or as a wired connection using an additional data cable connected to an optional data port on the tractor.

An optional voltage transformer 125 may be included in adapter 109. Voltage transformer 125 is configured to increase the voltage provided by the multiple power cable connections 129 and to deliver the increased voltage to the power cables 120 of cable assembly 112. The voltage transformer is optionally electrically connected to the metallic power cable(s) 120, and power terminals of the multiple power cable connections 129.

The control circuit 118 may be configured as a "master" node configured to send signals representing trigger data, commands, messages, or control signals to trailer components 115, and to receive and process status or operational information sent from trailer components 115. Such status information may include whether the trailer component is working properly, whether specific internal aspects of the trailer component have failed including information about which aspects are involved. Such status information may include outage of a lamp, camera malfunction, sensor failure, and the like. When the control circuit is configured as a "master", trailer components 115 may be individually configured as separate, "slave" nodes that receive and respond to instructional or control signals sent from the master, and that also send status information or other data to the master node.

Figure 4:
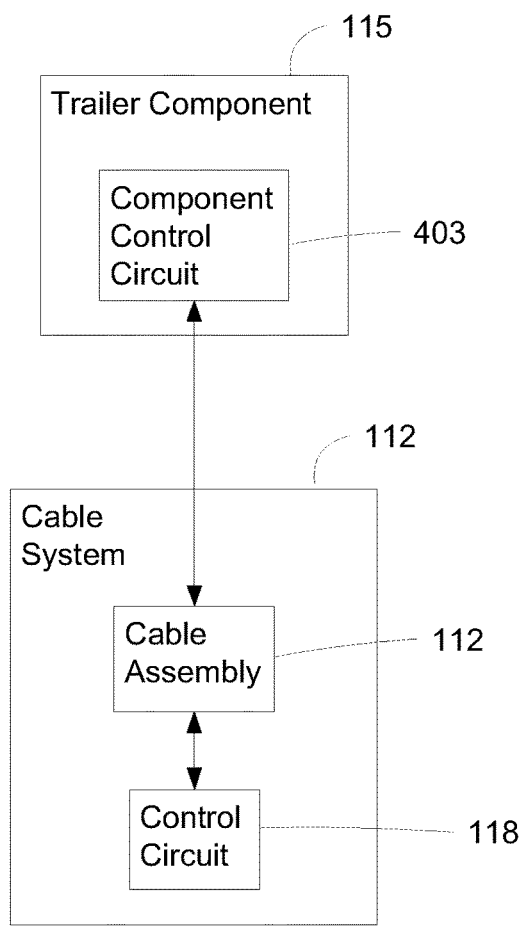
FIG. 4 is a component diagram illustrating one example the location of component control circuitry for trailer components of FIG. 1.
Figure 5:
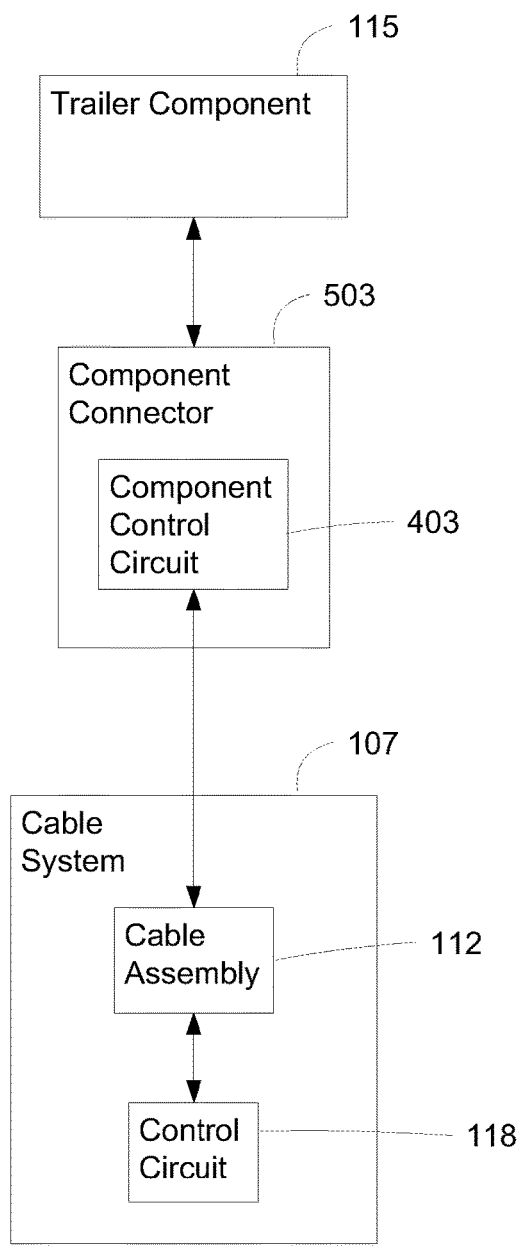
FIG. 5 is a component diagram illustrating another example of the location of component control circuitry for trailer components of FIG. 1.

As illustrated in FIGS. 4 and 5, trailer components 115 may optionally include a component control circuit 403 coupled to cable system 107. Control circuit 403 may be configured to send and/or receive data, receive power, or respond to control signals sent along the cable assembly 112. In one example, the multiple components of the truck trailer include a component control circuit electrically connected to at least the metallic power cable(s) 120 and the ground cable 131. The trailer component (an electronic device) may be electrically connected to the component control circuit, and the component control circuit may be configured to receive the component control signals sent by the control circuit 118.

The component control circuit 403 may be configured to selectively control the operation of the electronic device it is coupled to. For example, a temperature sensor 229 may include control logic in component control circuit 403 for obtaining temperature data from temperature sensor elements in sensor 229 and periodically sending that temperature data to control circuit 118 for processing. In another example, a right turn lamp 225 (and every other trailer component) may receive continuous power from control circuit 118 through cables 120. Component control circuit 403 may include switching and timing circuitry that may be activated by the command sent from control circuit 118 causing the right turn lamp to periodically activate and deactivate causing the lamp to operate in a blinking mode. Component control circuit 403 may optionally send a reply message back to control circuit 118 indicating that the message was received and that the specific trailer component is changed states and is operating as requested. Control circuit 118 may be configured to expect response messages from all trailer components when requested, at predetermined periodic intervals, or at other times thus allowing control circuit 118 to maintain status information about each trailer component and to notify the operator of the vehicle for trailer components failed or is not working correctly.

In another example shown in FIG. 5, the component control circuit 403 is included in a component connector 503 that may be constructed specifically for a particular type of trailer component 115 thus allowing trailer component 115 to be free of control circuitry specific to cable system 107. As in the example above, a standard LED or incandescent right turn lamp 225 may be coupled to component connector 503 thus electrically connecting the trailer component to cable system 107. Trailer component 115 (e.g. right turn lamp 225) may, in this example, be free of logic and control circuitry for sending and/or receiving power, control signals, and data, but may still be useable with cable system 107. In this example, component connector may operate as an adapter for trailer components 115, and may vary in construction according to the type of trailer component 115 coupled to the cable system. For example, a component connector for a back-up camera 255 may require a different type of connection from a component connector for a tire pressure sensor 241, or a cargo sensor 233 to name a few examples.

Connectors with differing built-in circuitry may, for example, be included in different locations around the trailer with the operational characteristics of the built-in circuitry varying according to the location so as to provide the required by government regulations, as well as other desirable behavior. For example, cable system 107 may include connectors with minimum brake light behavior programmed into the component control circuit in the connector with the connector then positioned at specific locations on the trailer required by government regulations. Conventional trailer components that do not include component control circuitry may be used with the disclosed cable system.

Figure 6:
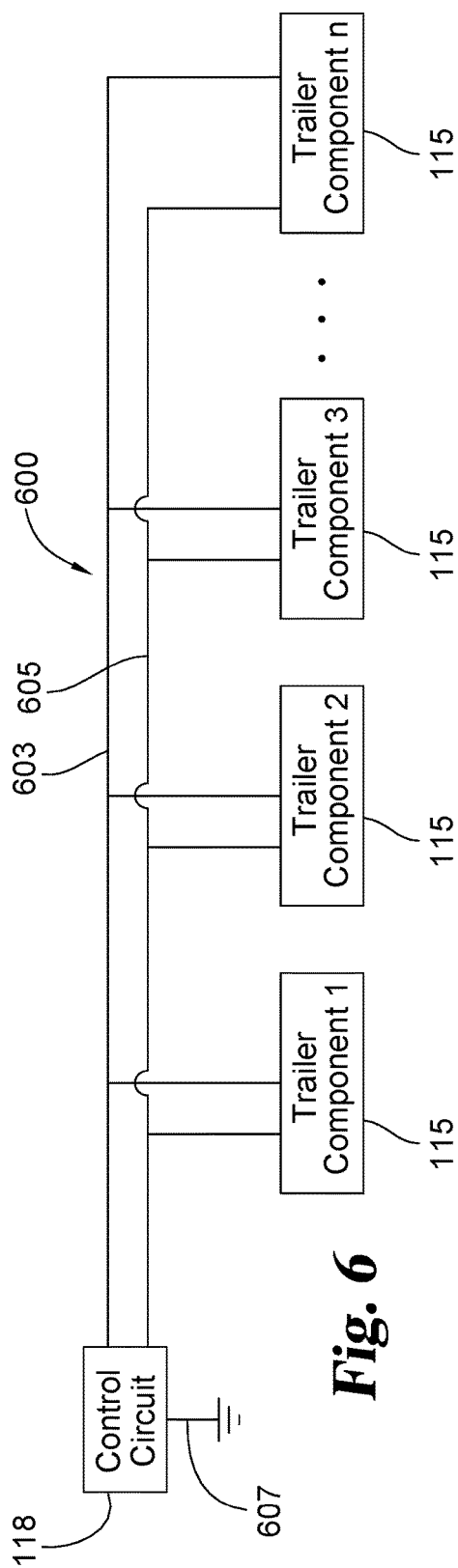
FIG. 6 is a component diagram illustrating the cable system of FIG. 1 with two cables.

The metallic cables in cable system 107 may be predominantly copper, aluminum, or any other suitable conductor. Reducing the cross-sectional size, or number of wires in cable system 107 may advantageously reduce overall usage of metal in the wiring for trailer 103 while providing minimum functionality required by government regulations, as well as possibly enhancing this functionality to improve operational characteristics of the trailer lighting system. For example, in the case where at least one of metallic power cables 120, metallic ground cable 131, and the optional communications cables 144 are used in cable assembly 112, these cables may together have an aggregate cross-sectional area that is at least ten percent 10% less than the about 32 $mm^2$ present in a conventional J-560 compliant cable system. The aggregate cross-sectional area of wiring in conventional J-560 cable system may be calculated as the aggregate of four metallic 12 AWG cables each with a cross-sectional area of 3.3 $mm^2$, two metallic 10 AWG cables each with a cross-sectional area of 5.3 $mm^2$, and one metallic 8 AWG cables each with a cross-sectional area of 8.4 $mm^2$, totaling the about 32 $mm^2$ in aggregate cross-sectional area of metallic cable. In other examples discussed in further detail below, other cabling combinations may be used in the cable assembly 112 to reduce metal usage by over 30%, over 60% less, or over 90%, to name a few nonlimiting examples Example 1: A 2-Wire Cable System One example of a cable system for a truck trailer is illustrated in FIG. 6 at 600. For example, multiple trailer components 115 may be electrically connected to a metallic power cable 120 designated in FIG. 6 as power cable 603. Power cable 603 may be electrically connected to carry power from control circuit 118 to any or all of trailer components 115. Each component may be configured to respond only to messages appropriate for, or addressing that node. Cable 603 may optionally be shielded to reduce or eliminate the effects of stray electrical or magnetic fields in the environment, or those created by the truck, trailer, or load carried by the trailer. A metallic ground cable 131 is shown and designated in FIG. 6 as ground cable 605. Ground cable 605 is electrically connected to a circuit ground 607 (e.g. the metal frame of the truck and/or the trailer).

In this example, the control circuit sends control signals to the components on the power cable. Triggering signals from control circuit 118 and status sent from trailer components 115 may send received by modulating the power delivered on power cable 603 without the need for any additional power cables to carry power, or communications cables to carry data signals. Any suitable transmission technique may be used such as any type of Power-line Communication (PLC) system. In one example, the control circuit 118 is configured as a "master" node configured to send instructional or control signals and to receive and process status information, while the trailer components 115 are individually configured as separate, "slave" nodes that receive and respond to instructional or control signals sent from the master, and that also send status information to the master node.

For example, trailer components 115 in FIG. 6 may include a vehicle tail lamp, and a vehicle turn signal lamp, both of which are electrically connected to power cable 603 and ground cable 605. Power is provided to both components on a single power node (e.g. 12V DC) provided by control circuit 118. In operation, when a truck operator signals a left turn, the appropriate left turn signal lamp or lamps are activated, and operated in a "blinking" mode indicating a turn to the drivers of nearby vehicles. Control circuit 118 receives signals from the truck indicating that the driver has activated the turn signal. Data signals representing this change in state are transmitted on power cable 603. Trailer components 115 receive these signals from control circuit 118.

The signals may include addressing data indicating which trailer component (e.g. left vehicle turn signal lamp) should respond, and may further indicate triggering data indicating the requested change in state (e.g. "start blinking"). Addressing data may indicate only which trailer component or groups of components are to respond to the message, and may explicitly or implicitly indicate which components or groups of components should not respond. In the case of a left turn, it is advantageous for the left turn signal lamp to activate in a blinking mode. Component control circuits for other components such as tail lamps, brake lamps, clearance lights, backup cameras, sensors, brake actuators may be programmed to ignore messages with address data specific to left turn signal lamps. In another example, address data may be sent indicating other components that should be activated as a group along with a conventional left turn signal lamp such as all left side clearance lights, or optionally a left side facing camera configured to provide begin sending a stream of video data of the area adjacent to the left side of the trailer when a left turn is indicated.

Figure 7:
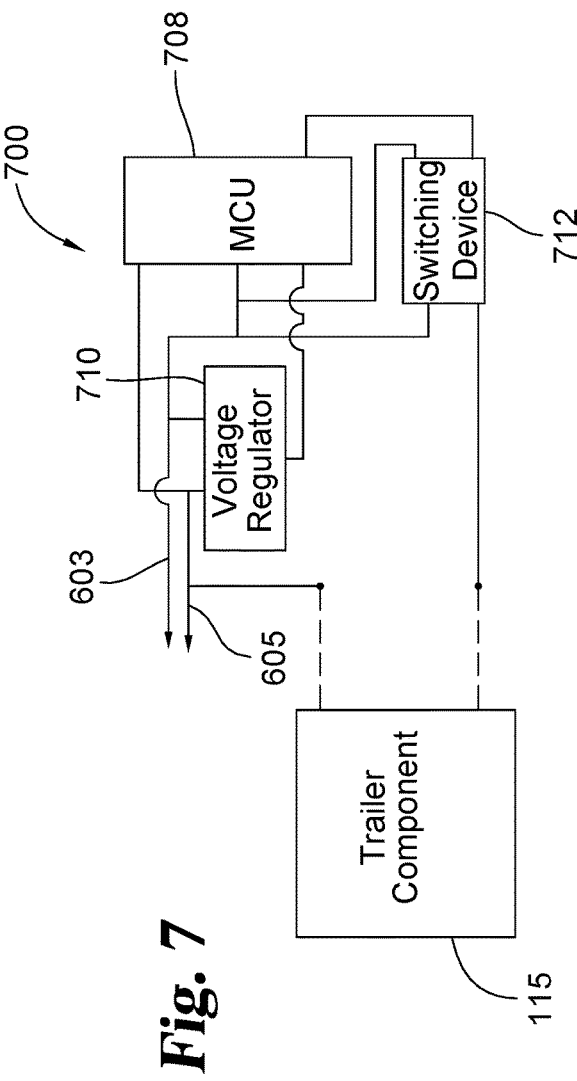
FIG. 7 is a component diagram illustrating aspects of the component control circuitry for trailer components in the cable system of FIG. 6.

One example of component control circuitry is illustrated in FIG. 7 at 700. Control circuitry 700 includes electrical connections to the power cable 603 and the ground cable 605, as well as a voltage regulator 710 which may be used to regulate the voltage according to the needs of a microcontroller 708. Switching device 712 may be responsive to signals from microcontroller 708 to control the flow of power from power cable 603 to trailer component 115. As discussed above, control circuitry 700 may be included with trailer components 115, or included in a socket or other connection point to which trailer components 115 are coupled for use. Microcontroller 708 may include memory, which may be programmed to differentiate the role to be played by each individual trailer component 115. For example, a microcontroller 708 for a left turn signal may be configured or programmed to respond only to left turn commands, or possibly to other commands such as braking that may be sent by control circuit 118. Specific components may be assigned one or more address values specific to their location on the trailer and/or functional capabilities. These addresses may be maintained by microcontroller 708 such that each trailer component may have a different address so that each component can identify itself individually and separate from other trailer components. In another aspect, groups of trailer components 115 may have other addressing data allowing them to respond together as a unit to certain messages.

In another aspect, microcontroller 708 may be configured to monitor the state of trailer component 115 and report the results to control circuit 118 by sending signals on power cable 603. The signals may include address information indicating to control circuit 118 which trailer component is reporting status, as well as information about the status itself. For example, in the case of a left turn lamp trailer components 115, microcontroller 708 may monitor and report when individual or multiple LED lamps included with trailer component 115 have failed or are failing. For example, failure codes, and identifying information identifying the individual LED within a given turn signal lamp may be sent to control circuit 118 for processing. Any suitable status information specific to a given trailer component may be sent to control circuit 118.

In the example of FIG. 6, a single power cable 603, and a single ground cable 605 may be implemented with wire of various sizes to advantageously reduce the overall wire usage for the trailer. For example, the power cable 603 and ground cable 605 may have a cross-sectional area less than or equal to a 8 AWG cable, which is to say each may have a cross-sectional area of 8.4 mm$^2$. In this example, up to 40 A of current may be provided on cable 603 at about 12 V resulting in up to about 480 W of available power but with a 48% reduction in the metallic material used as compared to a conventional J-560 compliant cable system.

In another example, voltage transformer 125 may be included in adapter 109 and configured to increase the voltage on power cable 603 from, for example, 12 V to 24 V. By increasing the voltage, a similar amount of power may be provided but with less current than what may be found in a conventional J-560 compliant cable system. In this example, power cable 603 and ground cable 605 may have a cross-sectional area less than or equal to 12 AWG cable, which is to say each may have a cross-sectional area of up to 3.3 mm$^2$. In this example, up to 20 A on cable 603 of current may be provided at about 24 V resulting in up to about 480 W of available power but with a 79% reduction in the metallic material used as compared to a conventional J-560 compliant cable system with seven wires.

In another example, voltage transformer 125 may increase the voltage on power cable 603 from, for example, 12 V to 48 V. In this example, power cable 603 and ground cable 605 may have a cross-sectional area less than or equal to 18 AWG cable, which is to say each may have a cross-sectional area of up to 0.823 mm$^2$. In this example, up to 10 A of current may be provided on cable 603 at about 48 V resulting in up to about 480 W of available power but with a 95% reduction in the metallic material used as compared to a conventional J-560 compliant cable system.

Example 2: A 3-Wire Cable System

Figure 8:
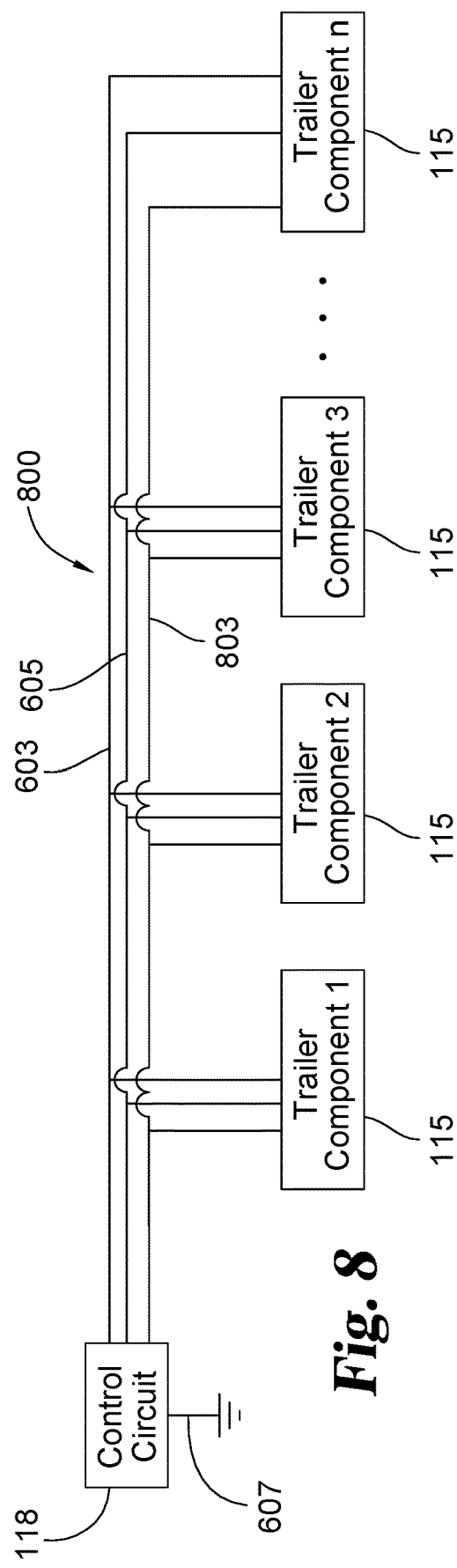
FIG. 8 is a component diagram illustrating the cable system of FIG. 1 with three cables.

Another example of a cable system for a truck trailer is illustrated in FIG. 8 at 800. In FIG. 8, multiple trailer components 115 are electrically connected to power cable 603. A separate communications cable 803 may be included for carrying signals between control circuit 118 and trailer components 115. Cable 803 may be shielded to reduce or eliminate the effects of stray electrical or magnetic fields in the environment, or that might be created by the truck, the trailer, or the load carried by the trailer. Metallic ground cable 605 is electrically connected to a circuit ground 607.

In this example, the control circuit sends the component control signals on the separate additional communications cable 803. Trailer components 115 may be configured to use communications cable 803 to receive commands or triggering signals from control circuit 118 and to send operational information back to control circuit 118. Any suitable transmission technique, architecture, or protocol using a single wire for transmissions may be used. Examples include RS-485 also designated as American National Standards Institute (ANSI) as TIA/EIA-485-A-1998 or using communications cable 803 as part of a Local Interconnect Network (LIN).

For example, trailer components 115 in FIG. 8 may include a vehicle tail lamp, and a vehicle right turn signal lamp, both of which are electrically connected to power cable 603, ground cable 605, and communications cable 803. Power is provided to both components on a single power node (e.g. 12V DC) provided by control circuit 118. Each component may be electrically connected to the same supply of operational power, a connection that may be maintained at all times during the operation of the trailer. However, each component may be configured to respond only to control signals or messages appropriate for that node received over the communications cable.

For example, in operation, when a truck operator signals a right turn, the appropriate right turn signal lamp or lamps are activated in a "blinking" mode indicating to nearby drivers that a turn is imminent. Control circuit 118 receives signals from the truck indicating that the driver has activated the turn signal. Data signals representing this change in state are transmitted on communications cable 803. Trailer components 115 receive the signals from control circuit 118.

The signals sent on communications cable 803 may include addressing data indicating which trailer component (e.g. right turn signal lamp) should respond, and may further indicate triggering data indicating the requested change in state (e.g. "start blinking"). Addressing data may indicate only which trailer component or groups of components are to respond to the message, and may explicitly or implicitly indicate which components or groups of components should not respond. In the case of a right turn, it is advantageous for the right turn signal lamp to activate in a blinking mode. Component control circuits for other components such as tail lamps, brake lamps, clearance lights, backup cameras, sensors, brake actuators may be programmed to ignore messages with address data specific to left turn signal lamps. In another example, address data may be sent indicating other components that should be activated as a group along with a conventional right turn signal lamp such as all right side clearance lights, or optionally a right side facing camera configured to provide begin sending a stream of video data of the area adjacent to the right side of the trailer when a right turn is indicated.

In the example of FIG. 8, a single power cable 603, a single ground cable 605, and a single communications cable 803 may be implemented with wire of various sizes to advantageously reduce the overall wire usage for the trailer. For example, the power cable 603 and ground cable 605 may have a cross-sectional area less than or equal to a 8 AWG cable, which is to say each may have a cross-sectional area of 8.4 mm$^2$. Communications cable 803 may have a cross-sectional area less than or equal to 18 AWG cable, which is to say cable 803 may have a cross-sectional area of up to 0.823 mm$^2$. In this example, up to 40 A of current may be provided by power cable 603 at about 12 V resulting in up to about 480 W of available power but with a 45% reduction in the metallic material used as compared to a conventional J-560 compliant cable system with seven wires.

In another example, voltage transformer 125 may be included in adapter 109 and configured to increase the voltage on power cable 603 from, for example, 12 V to 24 V. By increasing the voltage, a similar amount of power may be provided but with less current than what may be found in a conventional J-560 compliant cable system. In this example, power cable 603 and ground cable 605 may have a cross-sectional area less than or equal to 12 AWG cable, which is to say each may have a cross-sectional area of up to 3.3 mm$^2$. Communications cable 803 may have a cross-sectional area less than or equal to 18 AWG cable, which is to say cable 803 may have a cross-sectional area of up to 0.823 mm$^2$. In this example, up to 20 A of current may be provided on cable 603 at about 24 V resulting in up to about 480 W of available power but with a 77% reduction in the metallic material used as compared to a conventional J-560 compliant cable system.

In another example, voltage transformer 125 may increase the voltage on power cable 603 from, for example, 12 V to 48 V. In this example, power cable 603, ground cable 605, and communications cable 803 may each have a cross-sectional area less than or equal to 18 AWG cable, which is to say each may have a cross-sectional area of up to 0.823 mm$^2$. In this example, up to 10 A of current may be provided cable 603 at about 48 V resulting in up to about 480 W of available power but with a 92% reduction in the metallic material used as compared to a conventional J-560 compliant cable system with seven wires.

Example 3: A 4-Wire Cable System

Figure 9:
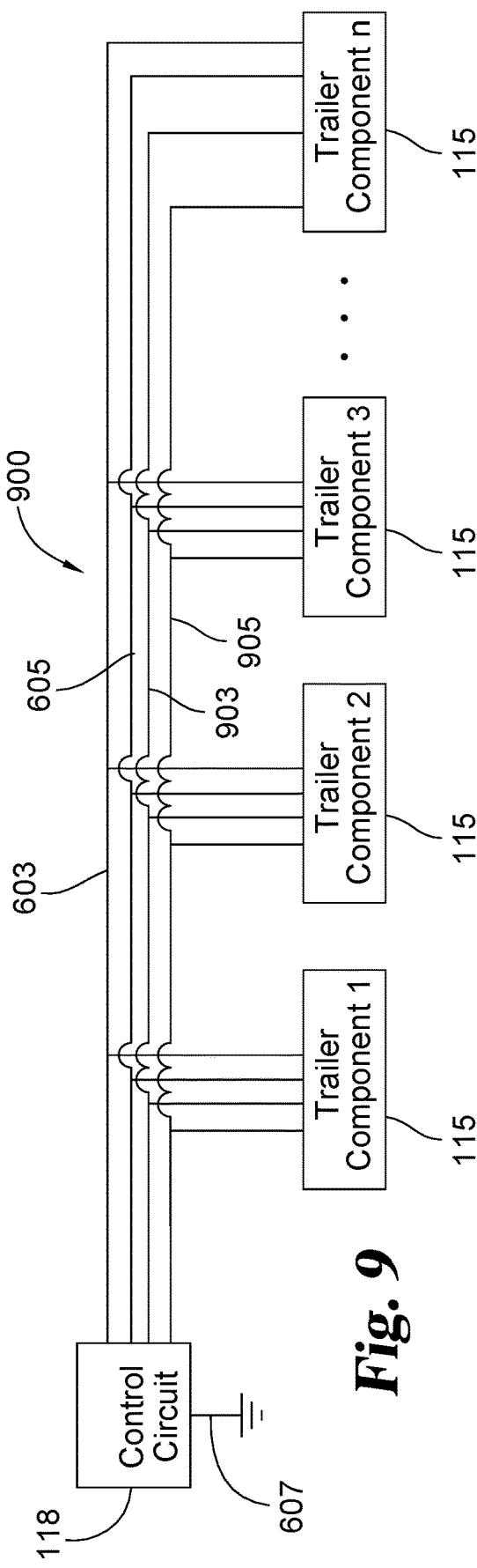
FIG. 9 is a component diagram illustrating the cable system of FIG. 1 with four cables.

Another example of a cable system for a truck trailer is illustrated in FIG. 9 at 900. In FIG. 8, multiple trailer components 115 are electrically connected to power cable 603 and ground cable 605. Two separate communications cable 903, and 905, may be included for carrying signals between control circuit 118 and trailer components 115. One or both of cables 903 and 905 may be shielded to reduce or eliminate the effects of stray electrical or magnetic fields in the environment, or that might be created by the truck, the trailer, or the load carried by the trailer. Metallic ground cable 605 is electrically connected to a circuit ground 607 (e.g. the metal frame of the truck and/or the trailer).

In this example, the control circuit sends the component control signals on the separate communications cables 903 and 905. Trailer components 115 may be configured to send status information and receive commands or triggering data as signals from control circuit 118 using communications cables 903 and 905. Any suitable transmission technique, architecture, or protocol using two signaling wires may be used. One example is a vehicle Control Area Network (CAN).

For example, trailer components 115 in FIG. 9 may include a trailer backup camera, a turn signal lamp, and a brake lamp, all of which are electrically connected to power cable 603, ground cable 605, and communications cables 903 and 905. Power is provided to all components on a single power node (e.g. 12V DC) provided by control circuit 118. Each component is electrically connected to the same supply of operational power, a connection that may be maintained at all times during the operation of the trailer. However, each component may be configured to respond only to control signals or messages appropriate for that component received over the communications cables.

For example, in operation, when a truck operator signals a right turn, the appropriate right turn signal lamp or lamps are activated in a "blinking" mode indicating to nearby drivers that a turn is imminent. Control circuit 118 receives signals from the truck indicating that the driver has activated the turn signal. Data signals representing this change in state are transmitted on power communications cables 903 and 905. Trailer components 115 receive the signals from control circuit 118. The signals may include information indicating which trailer component (e.g. right vehicle turn signal lamp) should respond, and may further indicate what activity should be taken. The signals may also include information indicating which trailer components should not respond. In the case of a right turn, it is advantageous for the right turn signal lamp to activate in a blinking mode while it may not be advantageous for other components to be activated as well. Thus, as discussed above, either the trailer components themselves may include component control circuitry, or this component control circuitry may be included in a socket or other connection point in the trailer.

In the example of FIG. 9, a single power cable 603, a single ground cable 605, and two communications cables 903 and 905 may be implemented with wire of various sizes to advantageously reduce the overall wire usage for the trailer. For example, the power cable 603 and ground cable 605 may have a cross-sectional area less than or equal to a 8 AWG cable, which is to say each may have a cross-sectional area of 8.4 mm$^2$. Communications cables 903 and 905 may have a cross-sectional area less than or equal to 18 AWG cable, which is to say cables 903 and 905 may have a cross-sectional area of up to 0.823 mm$^2$ each. In this example, up to 40 A of current may be provided by power cable 603 at about 12 V resulting in up to about 480 W of available power but with a 43% reduction in the metallic material used as compared to a conventional J-560 compliant cable system with seven wires.

In another example, voltage transformer 125 may be included in adapter 109 and configured to increase the voltage on power cable 603 from, for example, 12 V to 24 V. By increasing the voltage, a similar amount of power may be provided but with less current than what may be found in a conventional J-560 compliant cable system. In this example, power cable 603 and ground cable 605 may have a cross-sectional area less than or equal to 12 AWG cable, which is to say each may have a cross-sectional area of up to 3.3 mm$^2$. Communications cables 903 and 905 may have a cross-sectional area less than or equal to 18 AWG cable, which is to say each may have a cross-sectional area of up to 0.823 mm$^2$. In this example, up to 20 A of current may be provided at about 24 V resulting in up to about 480 W of available power but with a 74% reduction in the metallic material used as compared to a conventional J-560 compliant cable system with seven wires.

In another example, voltage transformer 125 may increase the voltage on power cable 603 from, for example, 12 V to 48 V. In this example, power cable 603, ground cable 605, and communications cables 903 and 905 may each have a cross-sectional area less than or equal to 18 AWG cable, which is to say each may have a cross-sectional area of up to 0.823 mm$^2$. In this example, up to 10 A of current may be provided at about 48 V resulting in up to about 480 W of available power but with a 90% reduction in the metallic material used as compared to a conventional J-560 compliant cable system with seven wires.

Figure 10:
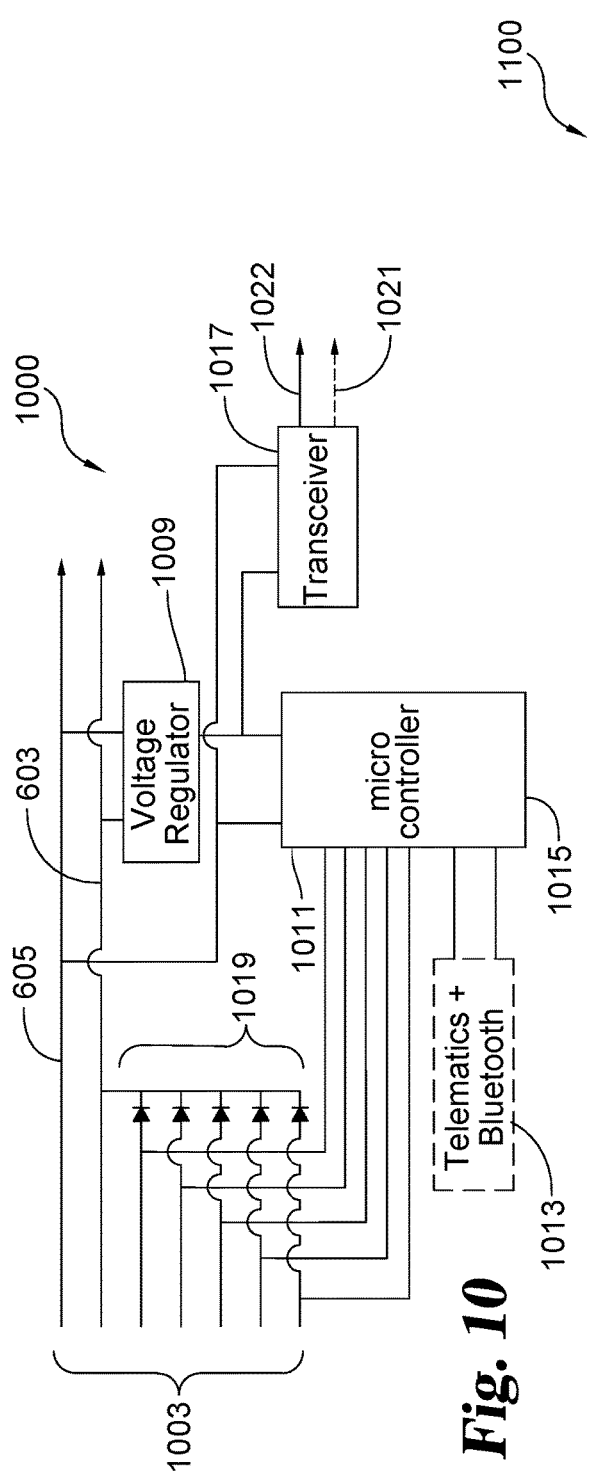
FIG. 10 is a component diagram illustrating aspects of the control circuitry for the cable system of FIGS. 8 and 9.
Figure 11:
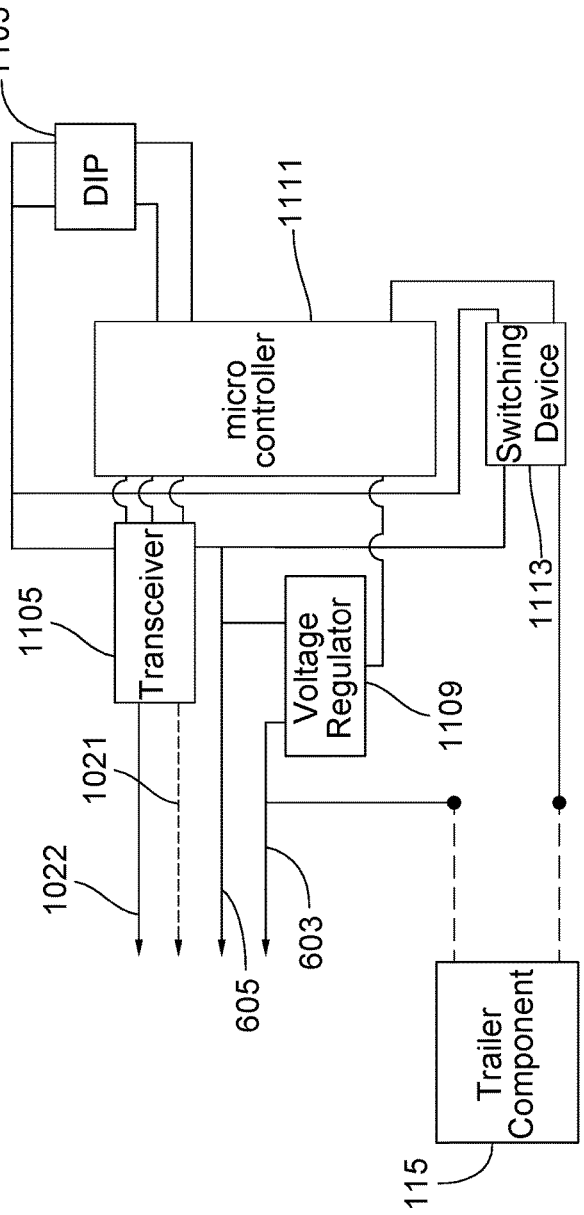
FIG. 11 is a component diagram illustrating aspects of the component control circuitry for trailer components in the cable system of FIGS. 8 and 9.

One example of control circuitry for a 3-wire or optionally a 4-wire cable system is illustrated in FIGS. 10 and 11. In FIG. 10, an example of circuitry that may be used in control circuit 118 is illustrated at 1000. Control and power inputs 1003 are electrically connected to microcontroller 1015. Any number of inputs may be included. In this example, seven separate connections (e.g. representing seven connections of a standard J-560 power cable) are included, six of which are coupled to power cable 603 through diode array 1019 included in this example to avoid return currents. The remaining input is electrically connected to ground cable 605.

Inputs 1003 may operate as control inputs indicating actions to be taken. For example, when a vehicle operator actuates the brake pedal of a truck, the truck sends power through at least one of the seven connections. Power on a given connection indicates to the microcontroller 1015 that the brake pedal has been pressed causing the microcontroller to send a message to any trailer components 115 that are prepared to respond to "brake pedal activation" type messages.

A voltage regulator 1009 may be included to provide regulated voltage to microcontroller 1015, transceiver 1017, and possibly other devices. For example, devices in the circuit may operate on 5 V, 3.3 V, or 12 V, or some other voltage, while power provided on power cable 603 may be provided at 12 V, 24 V, 48 V, or possibly in other higher or lower voltages. Optional communications cables 1022 and 1021 may be included electrically connecting the transceiver 1017 to transceivers in trailer components 115. In the case of 3-wire cable system such as a LIN discussed above, cable 1021 corresponds to communications cable 803. In the case of a 4-wire cable system such as a CAN discussed above, cable 1021 corresponds to communication cable 903, and cable optional cable 1022 is included and corresponds to communication cable 905. An optional "telematics" or "Bluetooth" enabled interface 1013 may be included to allow direct communication between the control circuitry and outside devices or systems via wireless communications In FIG. 11, component control circuitry 1100 includes electrical connections to the power cable 603 and the ground cable 605, as well as a voltage regulator 1109 which may be used to regulate the voltage according to the needs of a microcontroller 1111 and possibly other components in the circuit such as transceiver 1105. For example, microcontroller 1111 may operate on 5 V, 3.3 V, or 12 V, or some other voltage while power provided on power cable 603 may be provided at 12 V, 24 V, 48 V, or possibly in other higher or lower voltages.

Switching device 1113 may be responsive to signals from microcontroller 1111 to control the flow of power from power cable 603 to trailer component 115. As discussed above, control circuitry 1100 may be included with trailer components 115, or included in a socket or other connection point to which trailer components 115 are coupled for use. Microcontroller 1111 may include memory, which may be programmed to differentiate the role to be played by each individual trailer components 115. For example, a microcontroller 1111 for a left turn signal may be configured or programmed to respond only to left turn commands, or possibly to other commands such as braking that may be sent by control circuit 118. As discussed herein elsewhere, an addressing system may be used to assign values specific to each individual trailer component in the system. These addresses may be maintained by microcontroller 1111 such that each trailer component may have a different address allowing individual components to be notified independently and separate from other trailer components. Addressing functionality of control circuitry 1100 may optionally be implemented by a set of switches 1103, such as an array of Dual Inline Package (DIP) switches. Positioning each of the individual switches in predetermined patterns of "on" and "off" switches may provide microcontroller 1111 with addressing information unique to a particular trailer component. Increasing the number of DIP switches is one way of increasing the number of trailer components in the cable system that can be independently addressed.

In another aspect, microcontroller 1111 may include a nonvolatile memory configured to retain instructions or control logic controlling the behavior of the trailer component it is associated with. These instructions may be programmable, such as by a firmware update, or other programming mechanism. Thus trailer components, or sockets for accepting trailer components may be manufactured with identical circuitry, package size, physical connections, and the like, and then programmed according to the role they will play in the operation of the cable system during initial installation, or later when maintenance or repairs are being performed.

In another aspect, the disclosed cable system may allow the various electronic devices in the trailer to respond in an unconventional manner. For example, in a conventional J-560 cabling system, left and right turn signal lamps may only be activated when the driver indicates a left or right turn. This is because a conventional cabling system has separate dedicated wires for left turn lamps and right turn lamps. A third separate dedicated wire is used to activate stop lamps so that the activation of the stop lamps and turn signal lamps may be performed independently of one another.

In the disclosed cable system, control circuit 118 can be programmed to activate any suitable trailer components based on input from the truck by sending messages to any suitable components over the single power cable, or the optional additional communication cable or cables coupled to all electronic devices of the trailer. For example, in a left turn scenario where no braking is present, control circuit 118 may send messages to the left turn lamp and optionally to the brake lamp on the left side of the rear of the trailer to operate in a flashing mode. This may provide additional warning of the impending turn by flashing two lamps instead of the conventional single left turn lamp. In another example, control circuit 118 may activate left side brake lamps, and turn lamps along with left side clearance lights, identification lights, or other lamps mounted on the left side of the trailer. All electronic devices receiving this message may be programmed to respond by operating in a flashing mode, thus allowing substantially all of the lights on the left side of the trailer to operate in a blinking mode providing further warning.

In another example, where the brake is applied by the operator of the truck (without activating a turn signal), the conventional J-560 cabling system may only activate two brake lamps at the rear of the trailer which are connected to the dedicated brake lamp wire. In the disclosed system, the control circuit 118 may be programmed to activate brake lamps and turn signal lamps at the rear of the trailer by sending messages to any suitable components over the single power cable, or the optional additional communication cable or cables. In this example, brake lights and turn signal lights may be activated in a "steady on" mode rather than a blinking mode. In another aspect, all lights mounted on the rear of the trailer may be activated when a brake is applied. This may include clearance lamps, identification lamps, or any other suitable lamp in addition to brake lamps and/or turn signal lamps.

In another example, where the operator of the vehicle has activated a left turn signal and has also activated the brake, the conventional J-560 cabling system may only activate two brake lamps at the rear of the trailer in a "steady on" mode while also activating a single left turn lamp in a "flashing" mode. In the disclosed system, the control circuit 118 may be programmed to activate a left turn signal lamp in a flashing mode, brake lamps in a "steady on" mode, and the right turn signal lamp in a study on mode as well. Control circuit 118 may send activating messages to these or any other suitable components over the single power cable, or using the optional additional communication cable or cables coupled to all electronic devices of the trailer. In another aspect, other lights mounted on the sides and rear of the trailer may be activated when a brake is applied while turning left. For example, left side turn signal lamps, clearance lamps, or other lamps may be activated in a flashing mode while all other clearance lamps, brake lamps, or turn signal lamps, on the rear of the trailer may also be activated in a "steady on" mode.

Glossary of Definitions and Alternatives

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Aggregate cross-sectional area" generally refers to the total combined area of multiple cross sections which may be determined by adding the one or more cross sections together. For example, the aggregate cross-sectional area of multiple cables or wires is determined by adding together the cross-sectional areas of each of the multiple cables. For example, the aggregate cross-sectional area of four metallic 12 AWG cables each with a cross-sectional area of 3.3 mm², two metallic 10 AWG cables each with a cross-sectional area of 5.3 mm², and one metallic 8 AWG cable with a cross-sectional area of 8.4 mm², is about 32 mm².

"American Wire Gauge (AWG)" generally refers to a logarithmic stepped standardized wire gauge system referring to the diameters of round, solid, nonferrous, electrically conducting wire. Dimensions of the wires are given in ASTM standard B258. Increasing gauge numbers denote decreasing wire diameters.

The AWG tables are for a single, solid, round conductor. The AWG of a stranded wire is determined by the cross-sectional area of the equivalent solid conductor. Because there are also small gaps between the strands, a stranded wire generally have a slightly larger overall diameter than a solid wire with the same AWG.

"Anti-lock Braking System" generally refers to a vehicle safety system that allows the wheels on a motor vehicle (including trailers) to maintain tractive contact with the road surface according to driver inputs while braking, preventing the wheels from locking up (ceasing rotation) and avoiding uncontrolled skidding. ABS systems automatically apply the principles of threshold braking and cadence braking albeit a much faster rate and with better control than drivers can typically manage manually. ABS systems include wheel speed sensors to detect reduced wheel rotation indicative of impending wheel lock. An ABS controller is also included that can automatically actuate the braking system to reduce braking force on the affected wheel or wheels, and to quickly reapply braking force when the danger of wheel lock is reduced. This overall feedback loop may be executed multiple times a second resulting in rapid activation and deactivation of braking force or "pulsing" of the brakes.

Maximum braking force is obtained with approximately 10-20% slippage between the braked wheel's rotational speed and the road surface. Beyond this point, rolling grip diminishes rapidly and sliding friction provides a greater proportion of the force that slows the vehicle. Due to local heating and melting of the tires, the sliding friction can be very low. When braking at, or beyond, the peak braking force, steering input is largely ineffective since the grip of the tire is entirely consumed in braking the vehicle.

Threshold braking seeks to obtain peak friction by maintaining the maximum braking force possible without allowing wheels to slip excessively. Braking beyond the slipping point causes tires to slide and the frictional adhesion between the tire and driving surface is thus reduced. The aim of threshold braking is to keep the amount of tire slip at the optimal amount, the value that produces the maximum frictional, and thus braking force. When wheels are slipping significantly (kinetic friction), the amount of friction available for braking is typically substantially less than when the wheels are not slipping (static friction), thereby reducing the braking force. Peak friction occurs between the static and dynamic endpoints, and this is the point that threshold braking tries to maintain.

"Cadence" braking or "stutter" braking involves pumping the brake pedal and is used to allow a car to both steer and brake on a slippery surface. ABS systems generally provide this behavior automatically and at a much higher rate than most drivers can manually produce. It is used to effect an emergency stop where traction is limited to reduce the effect of skidding from road wheels locking up under braking. This can be a particular problem when different tires have different traction, such as on patchy ice for example. Cadence braking maximizes the time for the driver to steer around the obstacle ahead, as it allows the driver to steer while slowing.

ABS generally offers improved vehicle control and decreases stopping distances on dry and slippery surfaces; however, on loose gravel or snow-covered surfaces, ABS can significantly increase braking distance, although still improving vehicle steering control.

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used.

A cable may include a sheath or layer surrounding the cable with electrically non-conductive material to electrically insulate the cable from inadvertently electrically connecting with other conductive material adjacent the cable.

A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Communications cable" generally refers to a cable configured to carry digital or analog signals.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Control Area Network (CAN)" or "CAN bus" generally refers to a communication system and network protocol that may be used for intercommunication between components or subsystems of a vehicle. A CAN (sometimes referred to colloquially as a "CAN bus") allows one or more microcontrollers or CAN enabled devices to communicate with each other in real time without a host computer. A CAN may physically connect all nodes together through a two wire bus. The wires may be a twisted pair cable with a 120 ohm characteristic impedance. These wires may be thought of as "high" and "low" connections.

CAN may be thought of as an example of a multi-master serial bus for connecting Electronic Control Units (ECUs) also referred to as "nodes". Two or more nodes are required on the CAN network to communicate. The complexity of the node can range from a simple I/O device such as a sensor, an active device such as a lamp, transmission, or brake actuator, or an embedded computer or ECU with a CAN interface. A node may also be a gateway allowing a standard computer to communicate over a network connection such as a Universal Serial Bus (USB) or Ethernet port allowing outside devices to be selectively added or removed from the CAN network.

A CAN bus does not require any addressing schemes, as the nodes of the network use unique identifiers that may be provided by programming the individual node before use, or reprogramming between uses. This provides the nodes with information regarding the priority and the urgency of transmitted message.

Each node may include a central processing unit, microprocessor, or host processor. The host processor may be configured to determine what the received messages mean and what messages to transmit in response. A node may be electrically connect to sensors, actuators, lamps, or other electronic devices that can be connected to the host processor. A node may also include a CAN controller, optionally integrated into the microcontroller. The can control may implement the sending and receiving protocols. When receiving, the CAN controller may store the received serial bits from the bus until an entire message is available, which can then be fetched by the host processor (for example, by the CAN controller triggering an interrupt). When sending, the host processor may send the transmit message(s) to the CAN controller, which transmits the bits serially onto the bus when the bus is free. A node may also include a transceiver. When receiving: the transceiver may convert the data stream from CAN bus levels to levels that the CAN controller uses. It may have protective circuitry to protect the CAN controller. When transmitting, the transceiver may convert the data stream from the CAN controller to CAN bus levels.

Each node may be configured to send and receive messages, but not simultaneously. A message or Frame consists primarily of the ID (identifier), which represents the priority of the message, and up to eight data bytes. A CRC, acknowledge slot (ACK) and other overhead are also part of the message. The improved CAN FD extends the length of the data section to up to 64 bytes per frame. The message is transmitted serially onto the bus using a non-return-to-zero (NRZ) format and may be received by all nodes.

CAN data transmission may use a lossless bitwise arbitration method of contention resolution. This arbitration method may require all nodes on the CAN network to be synchronized to sample every bit on the CAN network at the same time. Thus data may be transmitted without a clock signal in an asynchronous format.

The CAN specifications may use the terms "dominant" bits and "recessive" bits where dominant is a logical 0 (actively driven to a voltage by the transmitter) and recessive is a logical 1 (passively returned to a voltage by a resistor). The idle state may be represented by the recessive level (logical 1). If one node transmits a dominant bit and another node transmits a recessive bit then a collision results and the dominant bit "wins". This means there is no delay to the higher-priority message, and the node transmitting the lower priority message automatically attempts to retransmit, for example, six bit clocks after the end of the dominant message.

All nodes on the CAN network generally operate at the same nominal bit rate, but noise, phase shifts, oscillator tolerance and oscillator drift mean that the actual bit rate may not be the same as the nominal bit rate. Since a separate clock signal is not used, a means of synchronizing the nodes is used. Synchronization is helpful during arbitration since the nodes in arbitration may see both their transmitted data and the other nodes' transmitted data at the same time. Synchronization is also helpful to ensure that variations in oscillator timing between nodes do not cause errors.

Synchronization may start with a hard synchronization on the first recessive to dominant transition after a period of bus idle (the start bit). Resynchronization may occur on every recessive to dominant transition during the frame. The CAN controller may expect the transition to occur at a multiple of the nominal bit time. If the transition does not occur at the exact time the controller expects it, the controller adjusts the nominal bit time accordingly.

Examples of lower-layer (e.g. levels 1 and 2 of the ISO/OSI model), are commercially available from the International Standardization Organization (ISO) and include ISO 11898-1 through 11898-6, as well as ISO 16845-1 and 16845-2.

CAN standards may not include application layer protocols, such as flow control, device addressing, and transportation of data blocks larger than one message, as well as, application data. Other CAN standards are available that are optimized for specific fields of use. These include, but are not limited to:

ARINC 812 or ARINC 825 (for the aviation industry)
CANopen—EN 50325-4 (used for industrial automation)
DeviceNet (used for industrial automation)
EnergyBus—CiA 454 (used for light electrical vehicles)
ISOBUS—ISO 11783 (agriculture)
ISO-TP—ISO 15765-2 (Transport protocol for automotive diagnostic)
SAE J1939 (In-vehicle network for buses and trucks)
MilCAN
NMEA 2000—IEC 61162-3 (marine industry)
Unified Diagnostic Services (UDS)—ISO 14229 (automotive diagnostics)
CANaerospace—Stock (for the aviation industry)
CAN Kingdom—Kvaser (embedded control system)
CCP/XCP (automotive ECU calibration)
GMLAN—General Motors (for General Motors)
RV-C—RVIA (used for recreational vehicles)
SafetyBUS p—Pilz (used for industrial automation)
UAVCAN (aerospace and robotics)

"Controller" generally refers to a mechanical or electronic device configured to control the behavior of another mechanical or electronic device. A controller may include a "control circuit" configured to provide signals or other electrical impulses that may be received and interpreted by the controlled device to indicate how it should behave.

"Cross-Sectional Area" generally refers to generally refers to the area of a non-empty intersection of a solid body in three-dimensional space with a plane.

The shape of the cross-section of a solid may depend upon the orientation of the cutting plane to the solid. For example, while all the cross-sections of a ball are disks of varying diameters, the cross-sections of a cube depend on how the cutting plane is related to the cube. If the cutting plane is perpendicular to a line joining the centers of two opposite faces of the cube, the cross-section will be a square, however, if the cutting plane is perpendicular to a diagonal of the cube joining opposite vertices, the cross-section can be either a point, a triangle or a hexagon.

A cross-section of a solid right circular cylinder extending between two bases is a disk if the cross-section is parallel to the cylinder's base, or an elliptic region if it is neither parallel nor perpendicular to the base. If the cutting plane is perpendicular to the base it consists of a rectangle unless it is just tangent to the cylinder, in which case it is a single line segment.

"Cross-Sectional Area of a cable" generally refers to the American Wire Gauge (AWG) of wire used in a cable. Where a cable includes multiple different wires with differing gauges coupled together, the cross-sectional area of a cable is the average of the different wire gauges used weighed according to the length of each different size of wire.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Diode" generally refers to a two terminal electrical device which allows current to flow in one direction, but prevents current from flowing in the opposite direction. Examples include p-n silicon junction diodes, light emitting diodes, Schottky diodes, and Zener diodes, to name a few.

"Electrically connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Ground cable" generally refers to a cable electrically connecting to a circuit ground.

"J-560 Compliant cabling system" generally refers to a cable system with multiple individual wires forming separate circuits in a truck trailer conforming to the Society of Automotive Engineers (SAE) J-560 standard. The J-560 standard requires an 8 AWG chassis ground wire, typically colored white, a 10 AWG wire (typically red) that is dedicated to brake or stop lamps, and a 10 AWG wire (often blue) that is dedicated to provide continuous ABS primary power and, alternatively, power for auxiliary devices. Four 12 AWG wires are commonly included (such as the yellow, green, brown, and black) wires, with the yellow wire dedicated to the left turn signal and hazard lamps, the green wire dedicated to the right turn signal and hazard lamps, the brown wire dedicated for tail and license plates and clearance and/or side marker lamps, and the black wire dedicated for clearance, side marker, and identification lamps. Thus, the conventional J-560 compliant cable system has an aggregate cross-sectional area of about 32 mm$^2$ calculated as the aggregate of four metallic 12 AWG cables each with a cross-sectional area of 3.3 mm$^2$, two metallic 10 AWG cables each with a cross-sectional area of 5.3 mm$^2$, one metallic 8 AWG cables each with a cross-sectional area of 8.4 mm$^2$.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-hallide, mercury-vapor, sulfer, neon, sodium-vapor, or others.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"LED Lamp" generally refers to an electrical device that uses Light Emitting Diodes (LEDs) to produce light using electrical power. A lamp may include a single LED, or multiple LEDs.

"LED fault signal" generally refers to a signal that is used to indicate the failure of an LED. The LED fault signal can take the form of power to illuminate a fault LED, a data message (such as via a serial communication protocol or other), a mechanical indicator, or other. The LED fault signal can be used to communicate a failed LED to an onboard computer or display system such as may be found in the cabin of a vehicle or a trailer.

"Local Interconnect Network (LIN)" generally refers to a network protocol used for communication between components in vehicles, usually by means of serial communication. LIN may be used also over the vehicle's battery power-line with a special LIN over DC powerline (DC-LIN) transceiver. Features of the protocol include, but are not limited to a single master, up to 16 slaves, Slave Node Position Detection (SNPD) that allows node address assignment after power-up, single wire communications greater than 19.2 Kbits/s with a bus length of 40 meters or less, guaranteed latency times, variable length of data frame (2, 4 and 8 byte frames), multi-cast reception with time synchronization, without crystals or ceramic resonators, data checksum and error detection, detection of defective nodes, and an operating voltage of 12V.

A LIN may be implemented as a single-wire network such as an asynchronous serial network described on ISO 9141. A microcontroller may generate all needed LIN data by software and is connected to the LIN network via a LIN transceiver. The LIN Master may use one or more predefined scheduling tables to start sending and receiving to the LIN bus. These scheduling tables contain relative timing information, where the message sending is initiated. One LIN Frame consists of the two parts header and response. The header is always sent by the LIN Master, while the response is sent by either one dedicated LIN-Slave or the LIN master itself.

Transmitted data within the LIN is transmitted serially as eight bit data bytes with one start bit, one stop-bit, and no parity (break field does not have a start bit and stop bit). Bit rates vary within the range of 1 kbit/s to 20 kbit/s, or more. Data on the bus is divided into recessive (logical HIGH) and dominant (logical LOW). The time normal is considered by the LIN Masters stable clock source, the smallest entity is one bit time (e.g. 52 us at 19.2 kbit/s).

Data may be transferred across the bus in fixed form messages of selectable lengths. The master task may transmit a header that consists of a break signal followed by synchronization and identifier fields. The slaves may respond with a data frame that consists of between 2, 4 and 8 data bytes plus 3 bytes of control information. Frame types include, unconditional frame, Event-triggered frame, Sporadic frame, Diagnostic frame, User-defined frame, Reserved frame. One example of a standard LIN is maintained by the International Organization for Standardization (ISO) as ISO/AWI 17987

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips.

Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems.

Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as:

1. a central processing unit—ranging from small and simple processors with registers as small as 4 bits or list, to complex processors with registers that are 32, 64, or more bits
2. volatile memory (RAM) for data storage
3. ROM, EPROM, EEPROM or Flash memory for program and operating parameter storage
4. discrete input and output bits, allowing control or detection of the logic state of an individual package pin
5. serial input/output such as serial ports (UARTs)
6. other serial communications interfaces like I²C, Serial Peripheral Interface and Controller Area Network for system interconnect
7. peripherals such as timers, event counters, PWM generators, and watchdog
8. clock generator—often an oscillator for a quartz timing crystal, resonator or RC circuit
9. many include analog-to-digital converters, some include digital-to-analog converters
10. in-circuit programming and in-circuit debugging support "Modulation" generally refers to a process of varying one or more properties of a signal using a separate signal that typically contains information to be transmitted. It may be thought of as merging the properties of two time-varying signals to create a third output signal that is the combination of both input signals. Modulation is useful in process of conveying data, such as in the case of transmitting a digital bit stream or an analog (continuously varying) signal using electromagnetic energy.

Analog modulation may transfer an analog baseband (or low pass) signal, for example an audio signal or TV signal, over an analog bandpass channel at a different frequency, for example over a limited radio frequency band or a cable TV network channel. Digital modulation may transfer a digital bit stream over an analog communication channel, for example over the public switched telephone network (where a bandpass filter limits the frequency range to 300-3400 Hz) or over a limited radio frequency band. Analog and digital modulation facilitate Frequency Division Multiplexing (FDM), where several low pass information signals are transferred simultaneously over the same shared physical medium, using different carrier frequencies. Digital baseband modulation, also known as "line coding", can transfer a digital bit stream over a baseband channel, typically a non-filtered copper wire such as a serial bus or a wired local area network. Pulse modulation may transfer a narrowband analog signal, for example, a phone call over a wideband baseband channel or, in some of the schemes, as a bit stream over another digital transmission system.

As used herein, analog modulation techniques may include, but is not limited to, any of the following alone or in combination:

1. Amplitude modulation (AM) (here the amplitude of the carrier signal is varied in accordance with the instantaneous amplitude of the modulating signal)
2. Double-sideband modulation with carrier (DSB-WC) (used on the AM radio broadcasting band)
4. Double-sideband suppressed-carrier transmission (DSB-SC)
5. Double-sideband reduced carrier transmission (DSB-RC)
6. Single-sideband modulation with carrier (SSB-WC)

8. Single-sideband modulation suppressed carrier modulation (SSB-SC)
9. Vestigial sideband modulation (VSB, or VSB-AM)
10. Quadrature amplitude modulation (QAM)
11. Frequency modulation (FM) (here the frequency of the carrier signal is varied in accordance with the instantaneous amplitude of the modulating signal)
13. Phase modulation (PM) (here the phase shift of the carrier signal is varied in accordance with the instantaneous amplitude of the modulating signal)
14. Transpositional Modulation (TM), in which the waveform inflection is modified resulting in a signal where each quarter cycle is transposed in the modulation process.

In digital modulation, an analog carrier signal may be modulated by a discrete signal. Digital modulation methods can be considered as digital-to-analog conversion and the corresponding demodulation or detection as analog-to-digital conversion. The changes in the carrier signal are chosen from a finite number of M alternative symbols (the modulation alphabet). As used herein, digital modulation techniques may include, but is not limited to, any of the following used either alone or in combination:
1. Binary PSK (BPSK), using M=2 symbols
2. Quadrature PSK (QPSK), using M=4 symbols
3. 8PSK, using M=8 symbols
4. 16PSK, using M=16 symbols
5. Differential PSK (DPSK)
6. Differential QPSK (DQPSK)
7. Offset QPSK (OQPSK)
8. π/4—QPSK
9. Audio frequency-shift keying (AFSK)
10. Multi-frequency shift keying (M-ary FSK or MFSK)
11. Dual-tone multi-frequency (DTMF)
12. Amplitude-shift keying (ASK)
13. On-off keying (OOK), the most common ASK form
14. M-ary vestigial sideband modulation, for example 8VSB
15. Quadrature amplitude modulation (QAM), a combination of PSK and ASK
16. Polar modulation like QAM a combination of PSK and ASK
17. Minimum-shift keying (MSK)
18. Gaussian minimum-shift keying (GMSK)
19. Continuous-phase frequency-shift keying (CPFSK)
20. Orthogonal frequency-division multiplexing (OFDM) modulation
21. Discrete multitone (DMT), including adaptive modulation and bit-loading
22. Wavelet modulation
23. Trellis coded modulation (TCM), also known as Trellis modulation
24. Direct-sequence spread spectrum (DSSS)
25. Chirp spread spectrum (CSS) according to IEEE 802.15.4a CSS uses pseudo-stochastic coding
26. Frequency-hopping spread spectrum (FHSS) applies a special scheme for channel release "Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Optionally" as used herein means discretionary; not required; possible, but not compulsory; left to personal choice.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qalcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Power Line Communication" (PLC) or generally refers to a system of electronic communication that transmits and receives signals on the same circuit used to transfer power. Examples including system that send data over common AC wiring in a home, or Broadband over Power Line (BPL) systems for carrying network traffic over high voltage transmission lines, as well as systems for in-vehicle communications.

In the vehicle context, data, voice, music and video signals may be transferred to throughout a vehicle by over direct current DC battery power-line. One example of is DC-BU, a technology for reliable and economical communication over noisy DC or AC power lines. Digital input data may be modulated and carried over the power line and then demodulated into the original digital data up receipt.

In DC-BUS or other PLC implementations, the signaling technology is byte oriented, allowing transfer of a single UART data byte or more over noisy channel (such as the powerline) at bit-rate up to 115.2 kbit/s, each transmitted byte is protected against errors caused by noisy environment. This method may operate on a channel ranging in the HF band. A narrow band signaling modulation may be used that is based on a combination of phase changes to transfer each byte. There is no restriction to the number of bytes. Any Universal Asynchronous Receiver-Transmitter (UART) based standards such as RS-232, RS-485 and LIN-bus can use a DC-BUS as a physical layer (as referred to in the OSI model).

"Sensor" generally refers to a transducer configured to sense or detect a characteristic of the environment local to the sensor. For example, sensors may be constructed to detect events or changes in quantities or sensed parameters providing a corresponding output, generally as an electrical or electromagnetic signal. A sensor's sensitivity indicates how much the sensor's output changes when the input quantity being measured changes.

"Sense parameter" generally refers to a property of the environment detectable by a sensor. As used herein, sense parameter can be synonymous with an operating condition, environmental factor, sensor parameter, or environmental condition. Sense parameters may include temperature, air pressure, speed, acceleration, the presence or intensity of sound or light or other electromagnetic phenomenon, the strength and/or orientation of a magnetic or electrical field, and the like.

"Signal" generally refers to a function or means of representing information. It may be thought of as the output of a transformation or encoding process. The concept generally includes a change in the state of a medium or carrier that conveys the information. The medium can be any suitable medium such as air, water, electricity, magnetism, or electromagnetic energy such as in the case of radio waves, pulses of visible or invisible light, and the like.

As used herein, a "signal" implies a representation of meaningful information. Arbitrary or random changes in the state of a carrier medium are generally not considered "signals" and may be considered "noise". For example, arbitrary binary data streams are not considered as signals. On the other hand, analog and digital signals that are representations of analog physical quantities are examples of signals. A signal is commonly not useful without some way to transmit or send the information, and a receiver responsive to the transmitter for receiving the information.

In a communication system, for example, a transmitter encodes a message to a signal, which is carried to a receiver by the communications channel. For example, the words "The time is 12 o'clock" might be the message spoken into a telephone. The telephone transmitter may then convert the sounds into an electrical voltage signal. The signal is transmitted to the receiving telephone by wires, at the receiver it is reconverted into sounds.

Signals may be thought of as "discrete" or "continuous." Discrete-time signals are often referred to as time series in other fields. Continuous-time signals are often referred to as continuous signals even when the signal functions are not continuous, such as in a square-wave signal.

Another categorization is signals which are "discrete-valued" and "continuous-valued". Particularly in digital signal processing a digital signal is sometimes defined as a sequence of discrete values, that may or may not be derived from an underlying continuous-valued physical process. In other contexts, digital signals are defined as the continuous-time waveform signals in a digital system, representing a bit-stream. In the first case, a signal that is generated by means of a digital modulation method may be considered as converted to an analog signal, while it may be considered as a digital signal in the second case.

"Socket" generally refers a device into which something fits in order to electrically and/or physically connect another electrical device to a circuit.

"Stop-tail-turn Lamp" or "STT Lamp" generally refers to a lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Terminal" generally refers to a plug, socket or other connection (male, female, mixed, hermaphroditic, or otherwise) for mechanically and electrically connecting two or more wires or other conductors.

"Truck" generally refers to a powered truck (also known as a tractor or cab) for pulling a trailer.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

What is claimed is:

1. A cable system for a truck trailer that reduces metal usage, comprising:
    An assembly of separate metallic cables that are at least ten meters long and include:
    (a) at least a first metallic power cable electrically connectable to multiple components of a truck trailer, wherein the power cable is electrically conductive, and wherein the multiple components include a vehicle tail lamp, and a vehicle turn signal lamp; and,
    (b) a metallic ground cable electrically connectable to the components of the truck trailer, wherein the metallic ground cable is electrically conductive; and,
    (c) optionally, at least one metallic communications cable connectable to the components of the truck trailer;
    wherein an aggregate cross-sectional area of the metallic power cable, the metallic ground cable, and each of the metallic communications cable when present, is at least ten percent (10%) less than the about 32 mm$^2$ present in a conventional J-560 compliant cable system calculated as the aggregate of:
        (i) four metallic 12 AWG cables each with a cross-sectional area of about 3.3 mm$^2$,
        (ii) two metallic 10 AWG cables each with a cross-sectional area of about 5.3 mm$^2$,
        (iii) one metallic 8 AWG cables each with a cross-sectional area of about 8.4 mm$^2$,
    Totaling the about 32 mm$^2$ in aggregate cross-sectional area of metallic cable.

2. A cable system for a truck trailer that reduces metal usage of claim 1, wherein the aggregate cross-sectional area of the metallic power cable, the metallic ground cable, and each of the metallic communications cable when present, is at least forty percent (40%) less than about 32 mm$^2$.

3. A cable system for a truck trailer that reduces metal usage of claim 1, wherein the metallic power cable and the metallic ground cable are predominantly copper.

4. A cable system for a truck trailer that reduces metal usage of claim 1, wherein the assembly of separate metallic cables further includes a second metallic power cable to provide dedicated electrical power to an Anti-lock Braking System (ABS) of the trailer.

5. A cable system for a truck trailer that reduces metal usage of claim 1, further comprising:
    an adapter which includes:
        an adapter plug with seven connection terminals corresponding to trailer connection terminals of a truck tractor, the seven connection terminals including a ground cable connection and six separate power cable connections, the adapter plug including:
            (a) at least two of the six separate power cable connections being combined to be electrically conductive with the metallic power cable;
            (b) the ground cable connection terminal to electrically connect to the metallic ground cable; and
        a control circuit configured to connect to at least one of the:
            (a) metallic power cable;
            (b) metallic ground cable;
            (c) optional communications cable;
        wherein the control circuit is configured to send thereacross communications signals to one or more of the multiple components of the truck trailer.

6. A cable system for a truck trailer, comprising:
    a metallic power cable electrically connectable to multiple components of a truck trailer, wherein the power cable is electrically conductive, and wherein the multiple components include a vehicle tail lamp, and a vehicle turn signal lamp;
    a metallic ground cable electrically connectable to the components of the truck trailer, wherein the ground cable is electrically conductive;

optionally, at least one communications cable connectable to the components of the truck trailer; and an adapter which includes:
an adapter plug with seven connection terminals corresponding to trailer connection terminals of a truck tractor, the seven connection terminals including a ground cable connection and six separate power cable connections, the adapter plug including:
(a) at least two of the six separate power cable connections being combined to be electrically conductive with the metallic power cable;
(b) the ground cable connection terminal to electrically connect to the metallic ground cable; and
a control circuit configured to connect to at least one of the:
(a) metallic power cable;
(b) metallic ground cable;
(c) optional communications cable;
wherein the control circuit is configured to receive thereacross communications signals from at least one of the multiple components of the truck trailer.

7. The cable system of claim 6, wherein the seven connection terminals of the adapter plug, and the trailer connection terminals are arranged according to a conventional J-560 trailer connection.

8. The cable system of claim 7, wherein the control circuit sends communications signals to the at least one of the multiple components of the truck trailer using the power cable.

9. The cable system of claim 6, wherein the multiple components of the truck trailer include:
a component control circuit electrically connected to the metallic power cable and the metallic ground cable; and
an electronic device electrically connected to the component control circuit;
wherein the component control circuit is configured to receive the communications signals sent by the control circuit of the adapter; and
wherein the component control circuit is configured to selectively control operation of the electronic device.

10. The cable system of claim 9, wherein the electronic device is an LED lamp.

11. The cable system of claim 6, wherein the multiple trailer components include vehicle stop-tail-turn lamps, vehicle turn signal lamps, vehicle brake lamps, vehicle tail lamps, vehicle running lamps, vehicle anti-lock brakes, vehicle interior illumination lamps, vehicle reverse lamps, or any combination thereof.

12. The cable system of claim 6, wherein the trailer components include an antilock brake system controller, pressure sensors, temperature sensors, door sensors, cargo sensors, cargo length sensors, liquid level sensors, refrigeration sensors, or any combination thereof.

13. The cable system of claim 6, wherein the metallic power cable has a cross-sectional area less than or equal to an 8 AWG cable.

14. The cable system of claim 6, wherein the metallic power cable has a cross-sectional area less than or equal to an 12 AWG cable.

15. The cable system of claim 14, wherein the control circuit is operable to provide at least 24 Volts and not more than 20 Amperes using the metallic power cable.

16. The cable system of claim 6, wherein the metallic power cable has a cross-sectional area less than or equal to an 18 AWG cable.

17. The cable system of claim 16, wherein the control circuit is operable to provide at least 48 Volts and not more than 10 Amperes using the metallic power cable.

18. The cable system of claim 6, further comprising:
a voltage transformer electrically connected to the metallic power cable and at least one of the seven connection terminals, wherein the voltage transformer and is configured to increase the voltage provided by at least one of the seven connection terminals and to deliver the increased voltage to the metallic power cable.

19. The cable system of claim 18, wherein the voltage transformer increases the voltage from 12 volts to at least 24 volts.

20. The cable system of claim 6, wherein the metallic power cable, and the metallic ground cable include electrically conductive material, and wherein the electrically conductive material used is less than 40 percent of the electrical conductive material used in a conventional J-560 compliant cable system.

21. The cable system of claim 6, wherein the at least one optional communications cable includes a first communications cable and a second communications cable, wherein both of the communications cables are electrically connected to the control circuit of the adapter with the multiple vehicle components, and wherein the electrical signals generated by the control circuit are sent on both of the communications cables.

22. The cable system of claim 21, wherein the first and second communications cables have a cross-sectional area less than or equal to the cross-sectional area of the power cable or the metallic ground cable.

23. The cable system of claim 21, wherein the control circuit further comprises:
a Control Area Network (CAN) controller electrically connected to at least one of the trailer connection terminals; and
a CAN transceiver electrically connected to the CAN controller and the first and second communications cables;
wherein the electrical signals sent by the control circuit are generated by the CAN controller and sent by the CAN transceiver.

24. The cable system of claim 23, wherein the multiple components of the truck trailer include:
a component control circuit electrically connected to the power cable and the ground cable, the component control circuit including:
a CAN controller electrically connected to the metallic power and ground cables;
a CAN transceiver electrically connected to the CAN controller and the first and second communications cables; and
an electronic device electrically connected to the metallic power cable and the CAN controller;
wherein the CAN transceiver in the component control circuit is responsive to the CAN transceiver of the control circuit; and
wherein the CAN controller is configured to control the electronic device.

25. The cable system of claim 22, wherein the first and second communications cables have a cross-sectional area less than or equal to the cross-sectional area of the metallic power cable or the metallic ground cable.

26. The cable system of claim 24, wherein the electronic device is an LED lamp.

* * * * *